US011900308B2

(12) United States Patent
Toohey et al.

(10) Patent No.: US 11,900,308 B2
(45) Date of Patent: *Feb. 13, 2024

(54) INFORMATION SYSTEM FOR ITEM VERIFICATION

(71) Applicant: Aglive International PTY. LTD., Highton (AU)

(72) Inventors: Mark Toohey, Burwood (AU); Alex Taylor, Burwood (AU); Jason Williams, Burwood (AU)

(73) Assignee: Aglive International Pty. Ltd., Vic (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,711

(22) Filed: Jun. 20, 2022

(65) Prior Publication Data

US 2022/0318744 A1 Oct. 6, 2022

Related U.S. Application Data

(63) Continuation of application No. 16/089,995, filed as application No. PCT/AU2017/000078 on Mar. 31, 2017, now Pat. No. 11,367,039.

(30) Foreign Application Priority Data

Mar. 31, 2016 (AU) .............................. 2016901208
Jan. 16, 2017 (AU) .............................. 2017900116

(51) Int. Cl.
*G06Q 50/18* (2012.01)
*G07C 13/00* (2006.01)
(Continued)

(52) U.S. Cl.
CPC ... *G06Q 10/0833* (2013.01); *G06K 19/07758* (2013.01); *G06Q 10/083* (2013.01);
(Continued)

(58) Field of Classification Search
CPC ... G06Q 10/0833; G06Q 10/087; H04W 4/35; G06K 19/07758
See application file for complete search history.

(56) References Cited

U.S. PATENT DOCUMENTS 6,496,806 B1 12/2002 Horwitz et al.
6,901,304 B2 5/2005 Swan et al.
(Continued)

FOREIGN PATENT DOCUMENTS

| GB | 2429078 | 2/2007 |
|---|---|---|
| WO | WO 2007/056712 | 5/2007 |
| WO | WO 2014/098610 | 6/2014 |

OTHER PUBLICATIONS

Benjamin Herzberg, "Blockchain: The Solution for Transparency in Product Supply Chains", Paper, Nov. 21, 2015, 1-21, Provenance, Project Provenance Ltd.

(Continued)

*Primary Examiner* — Talia F Crawley
(74) *Attorney, Agent, or Firm* — The Law Office of Kevin McDermott, P.L.L.C.

(57) ABSTRACT

A method for recording a custodial chain and identifying anomalies in the chain; said method comprising
defining or identifying a first element and assigning a first element identifier to it;
associating the first element identifier physically with the first element;
defining or identifying at least a second element and assigning a second element identifier to it;
associating the second element identifier physically with the second element;
aggregating the at least first element and second element physically as an aggregated element and assigning an aggregated element identifier to it;

(Continued)

defining an aggregated element record which includes the aggregated element identifier and the at least first element identifier and the at least second element identifier;

recording the identifiers as records in a database.

11 Claims, 14 Drawing Sheets

(51) Int. Cl.
    *G06Q 10/0833*     (2023.01)
    *G06Q 10/087*     (2023.01)
    *G06Q 50/28*     (2012.01)
    *G06Q 10/083*     (2023.01)
    *H04W 4/35*     (2018.01)
    *G06K 19/077*     (2006.01)

(52) U.S. Cl.
    CPC ........... *G06Q 10/087* (2013.01); *G06Q 50/28* (2013.01); *H04W 4/35* (2018.02)

(56) References Cited

U.S. PATENT DOCUMENTS

| | | |
|---|---|---|
| 7,724,138 B2 | 5/2010 | Horwitz et al. |
| 7,969,306 B2 | 6/2011 | Ebert et al. |
| 8,063,736 B2 | 11/2011 | Costa et al. |
| 9,336,248 B2 | 5/2016 | Li et al. |
| 9,619,851 B1* | 4/2017 | McIntyre ............. H04N 23/661 |
| 2002/0091593 A1* | 7/2002 | Fowler ............... G06Q 30/0601 |
| | | 705/28 |
| 2002/0095601 A1* | 7/2002 | Hind .................... H04L 9/3247 |
| | | 713/176 |
| 2004/0019609 A1* | 1/2004 | Orton, III ............. G06Q 10/10 |
| 2004/0088231 A1* | 5/2004 | Davis, Jr. ............. G06Q 10/087 |
| | | 705/28 |
| 2006/0106718 A1 | 5/2006 | Spellman et al. |
| 2006/0235805 A1 | 10/2006 | Peng et al. |
| 2007/0219916 A1* | 9/2007 | Lucas .................... G06Q 10/08 |
| | | 705/58 |
| 2008/0224823 A1* | 9/2008 | Lawson .................. G06F 21/34 |
| | | 340/5.8 |
| 2009/0198541 A1* | 8/2009 | Dolan .................. G06Q 10/087 |
| | | 705/29 |
| 2009/0230190 A1 | 9/2009 | Chanez et al. |
| 2011/0047183 A1 | 2/2011 | Ford et al. |
| 2011/0154046 A1 | 6/2011 | Fradet et al. |
| 2011/0169602 A1 | 7/2011 | Gaffney |
| 2013/0185217 A1 | 7/2013 | Fiedler et al. |
| 2014/0032378 A1* | 1/2014 | Damnjanovic .... G06Q 30/0623 |
| | | 705/28 |
| 2014/0324786 A1 | 10/2014 | Li et al. |
| 2015/0170112 A1* | 6/2015 | DeCastro ............. G06Q 20/381 |
| | | 705/39 |
| 2015/0379510 A1 | 12/2015 | Smith |
| 2016/0098723 A1* | 4/2016 | Feeney ................ G06Q 20/065 |
| | | 705/75 |
| 2016/0253622 A1* | 9/2016 | Sriram .................. H04L 9/3247 |
| | | 713/179 |
| 2016/0267428 A1* | 9/2016 | Hodges ............ G06K 19/06009 |
| 2016/0267432 A1* | 9/2016 | Hodges .............. G06Q 10/0833 |
| 2016/0267489 A1* | 9/2016 | Hodges ................ G06Q 10/087 |
| 2016/0267568 A1* | 9/2016 | Hodges ............. G06F 16/9566 |
| 2016/0269182 A1* | 9/2016 | Sriram .................. H04L 9/0869 |
| 2017/0032382 A1* | 2/2017 | Shulman ............ G06Q 30/0185 |
| 2017/0083907 A1* | 3/2017 | McDonough ........ G06Q 20/384 |
| 2017/0085555 A1* | 3/2017 | Bisikalo ................ G06F 3/0619 |
| 2017/0109735 A1* | 4/2017 | Sheng ................ G06Q 20/3678 |
| 2018/0182050 A1* | 6/2018 | McIntyre ............. G06Q 10/087 |
| 2018/0365386 A1 | 12/2018 | Vanderveen |
| 2019/0013934 A1 | 1/2019 | Mercuri et al. |
| 2019/0188984 A1* | 6/2019 | McLaughlin ..... G06F 16/90335 |

OTHER PUBLICATIONS

Anonymous, "Case Study 3: Chain of Shipping", Jan. 1, 2016, 1-10, Chain of Things, Chain of Things Ltd.

Pilkington; "Blockchain Technology: Principles and Applications"; Research Handbook on Digital Transformations; Sep. 24, 2015.

International Preliminary Report on Patentability for International Application No. PCT/AU2017/000078, dated Jul. 23, 2018, pp. 1-5.

\* cited by examiner

Figure 4 Package condition process

INFORMATION SYSTEM FOR ITEM VERIFICATION

CROSS-REFERENCE TO RELATED APPLICATIONS

This application is a continuation of U.S. application Ser. No. 16/089,995, filed Sep. 28, 2018, which is the National Stage of International Application No. PCT/AU2017/000078, filed Mar. 31, 2017, the disclosures of which are incorporated herein by reference.

TECHNICAL FIELD

The present invention relates to an information system for item verification. The system is applicable to individual items and also to items grouped together.

Some embodiments of the present invention make use of a distributed ledger to verify the provenance and authenticity of an item ("System"). It outlines how custody of a particular item may pass between any number of custodians before reaching a potential customer. The System allows that customer to verify the authenticity of the item and check its provenance through accessing a distributed ledger.

BACKGROUND

Tracking items of stock has been used for the purposes of inventory management and to inform any person further down the supply chain where their order is in the supply chain and hence provide an estimate on arrival. Tracking stock has also been used to identify the final location of specific items in case a recall may be necessary.

It is common to mechanically attribute a tag that contains a unique ID to an item of stock. Radio frequency identification tags (RFID) being one such method that allows easy scanning of the tag so that information can be read from the tag and sent directly to a database or other management system.

There exists systems that can record the location of an item of stock each time it is scanned and thus track its physical location as it moves through the supply chain (U.S. Pat. No. 6,901,304B2). This system has been extended to use a virtual world to illustrate the location of stock and even relate the speed of travel to external events such as traffic delays (U.S. Pat. No. 7,969,306B2). The limitation of both these systems is that they only track a single tag, and so at each new location the tag needs to be scanned, which may involve unpacking to access the tag. It thus needs to be decided whether to tag each individual item of stock or container which holds multiple items of stock.

To overcome the problem of needing to scan each tag at each new location, the use of Cluster IDs allows each tag ID to be linked in the computer system to a cluster ID of the specific holding means for example a pallet in which a particular item of stock has been packed (U.S. Pat. No. 6,496,806B1). As a result the location of a particular item of stock may be tracked by the cluster in which it has been packed. Thus, at each new location the external of the holding means may be scanned rather than needing to unpack the holding means.

It is an object of the present invention to apply this technology to the verification of items in a supply chain at the granular level.

It is a further or alternative object to assist in the verification of identity or origin of components either individually or in groups.

SUMMARY OF THE INVENTION

In one broad form of the invention there is provided a method for recording a custodial chain and identifying anomalies in the chain; said method comprising
 defining or identifying a first element and assigning a first element identifier to it;
 associating the first element identifier physically with the first element;
 defining or identifying at least a second element and assigning a second element identifier to it;
 associating the second element identifier physically with the second element;
 aggregating the at least first element and second element physically as an aggregated element and assigning an aggregated element identifier to it;
 defining an aggregated element record which includes the aggregated element identifier and the at least first element identifier and the at least second element identifier;
 recording the identifiers as records in a database.

Preferably the method further includes associating a sub element with each element identifier; the sub element containing data related to the element identifier and its passage along the chain.

Preferably the database is in the form of a blockchain structure.

Preferably the database is in the form of a distributed database structure.

Preferably the sub-element contains customization data.

Preferably the customization data includes a custodian identifier unique to each custodian in the chain.

Preferably the method comprises multiple, successive aggregation steps, followed by multiple de-aggregation steps, Preferably the method comprises multiple, successive aggregation steps, defining multiple successive aggregation records, followed by multiple de-aggregation steps, made with reference to the aggregation records.

Preferably the steps in the chain include spending, allocating, transacting.

Preferably the method further includes the step of reading and communicating the identifiers to the database each time an event occurs in the custodial chain preferably the method further includes the step of amending the sub element at the time of each event.

Preferably the method further includes the step of amending which occurs during a step of spending.

Preferably the method further includes a checking step which involves checking that each identifier is identified only once at each step/event in the chain.

Preferably the method further includes the step of raising an alarm condition if identifier is identified more than once or if an identifier does not exist in the database.

In a preferred form an alarm condition is excluded if the sub element data is changed as part of an event.

In a preferred form the sub element includes the address of a holder

In a preferred form the sub element includes rules created by the originator.

Preferably the sub element includes rules created by the originator.

In a further broad form of the invention there is provided a method of verification of an aspect of an item; said method comprising of ascribing a unique identifier to the item in respect of that aspect; storing the unique identifier in a table referenced against the item on a server; causing transmission of the item from a first location to a second location; a user accessing by reference to the item itself the unique identifier ascribed to the item; causing a comparison of the unique identifier thus obtained with the unique identifier stored on the server referenced against the item whereby the aspect of the item is verified if the unique identifier thus obtained matches with the unique identifier stored on the server referenced against the item.

Preferably the aspect comprises the origin of the item.

Preferably the aspect comprises the sponsorship or approval of the item.

Preferably the aspect comprises the originator of the item.

Preferably the table is maintained in a blockchain structure maintained by and accessible across a multiplicity of servers.

In yet a further broad form of the invention there is provided a computer program comprising of at least one instruction for controlling a computer system for to implement the method described above.

A computer readable medium storing a computer program in as described above.

A communications signal transmitted by an electronic system implementing the method described above.

In yet a further broad form of the invention there is provided a system of verification of an aspect of an item; said system comprising a processor which ascribes a unique identifier to the item in respect of that aspect; the processor storing the unique identifier in a table in memory referenced against the item on a server; causing transmission of the item from a first location to a second location by use of a communications system; a user accessing by use of a digital device and by reference to the item itself the unique identifier ascribed to the item; the digital device and the processor causing a comparison of the unique identifier thus obtained with the unique identifier stored on the server referenced against the item whereby the aspect of the item is verified if the unique identifier thus obtained matches with the unique identifier stored on the server referenced against the item.

Preferably the aspect comprises the origin of the item.

Preferably the aspect comprises the sponsorship or approval of the item.

Preferably the aspect comprises the origin of the item.

Preferably the aspect comprises the sponsorship or approval of the item.

Preferably the aspect comprises the originator of the item.

Preferably the table is maintained in a blockchain structure maintained by and accessible across a multiplicity of servers.

Preferably the table is maintained in a blockchain structure maintained by and accessible across a multiplicity of servers.

DETAILED DESCRIPTION OF PREFERRED EMBODIMENTS

Embodiments of the present invention relate to a system, and associated method for using the system, in order to track items of stock and record details of packing and unpacking of items in a supply chain.

In preferred forms embodiments of the system are capable of allowing multiple levels of packing assigning tags to each new packaging level. For example, the item of stock is a single package with a Tag ID, this is then packed in a carton which is given a carton ID, the pallets are then packed into a pallet which is given a pallet ID, and the pallets are packed into a container which is given a container ID. To move stock in a packed or unpacked form it is necessary to assign a custodian. The custodial chain starts when the manufacturer hands custody to the first custodian who in turn passes custody along the supply chain. Custodians may be freight forwarders, rail, trucking, port, container terminal, and warehouse operators or other allied members of the supply chain who move goods along the chain from the factory to the store shelf. The stock is transported and passed along the supply chain until it eventually reaches the shop owner who fully unpacks and displays the stock.

To record the movement of stock, it is necessary to have a database of all items of stock, the way in which they are packaged, and their transportation. This database needs to be shared by all users and each user allowed to update the database in accordance with their position. In one form the database may be implemented by a Blockchain structure as a distributed database system intended to maintain a complete record and be secure against alteration.

To record the packing and then unpacking of the items of stock, as well as transfer of packed items to a new custodian the present system treats each action as a transaction recording this in a database that follows a blockchain structure. Each action is a transaction recorded permanently. Each user, be it the manufacturer, a supply chain participant, wholesaler, or a store, may (but is not required) to keep a copy of the database following the distributed ledger feature of blockchain. The reason to use a distributed ledger when tracking items of stock is to allow a validation of the path that any particular item has followed and to minimise the risk of tampering (or identify it with a faulty record) anywhere along the chain. Any alteration of the blockchain will result in an error message and the stock affected by the identified alteration can be removed from circulation for inspection.

By maintaining a complete record of the movement of any item of stock using the blockchain structure means that a customer can trace back the movement of any item of stock and so have confidence that non-genuine items are not being sold or resold.

Figure 1A:
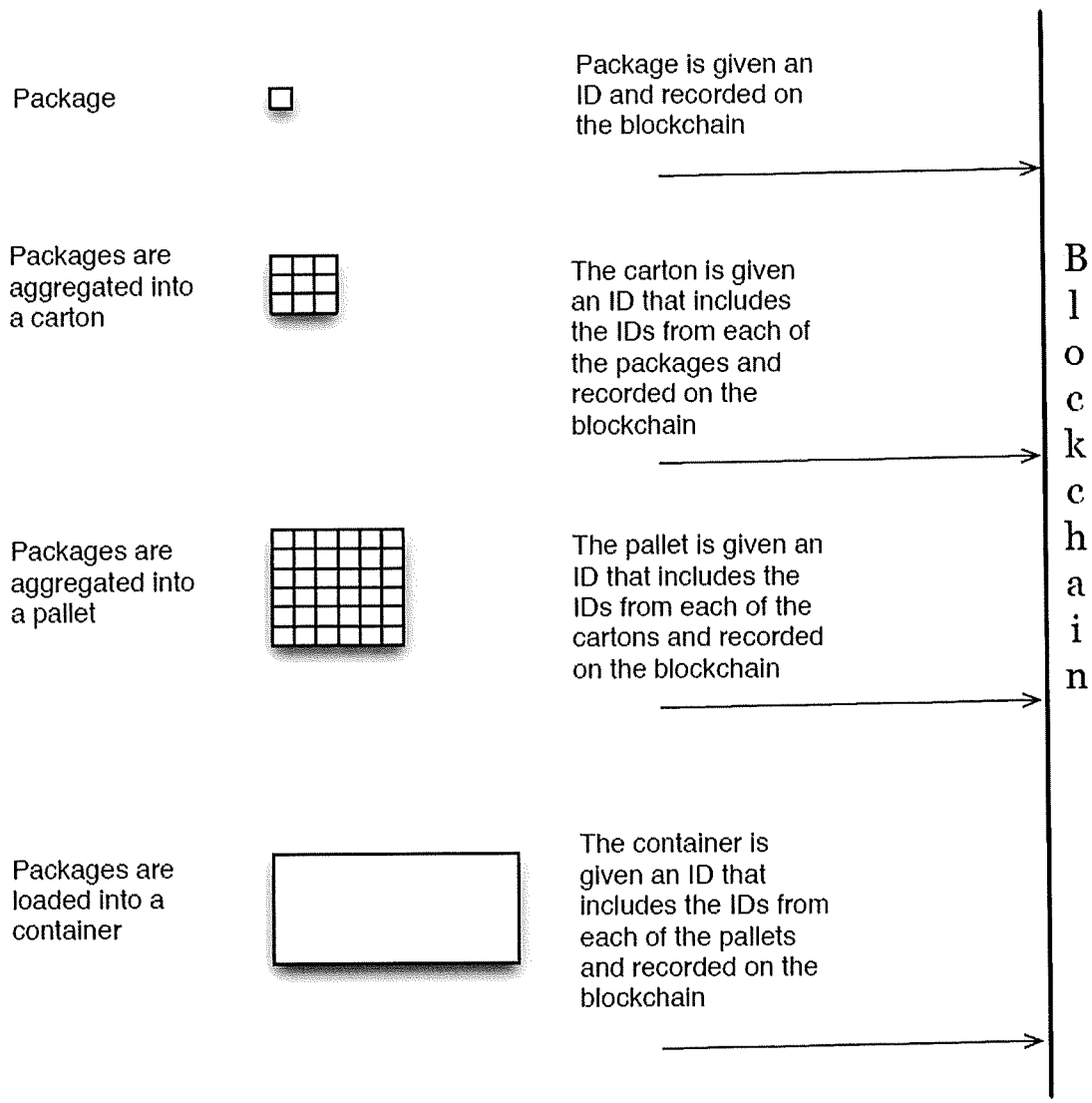
FIG. 1A illustrates in block diagram form packing steps in accordance with embodiments of the invention.
Figure 1B:
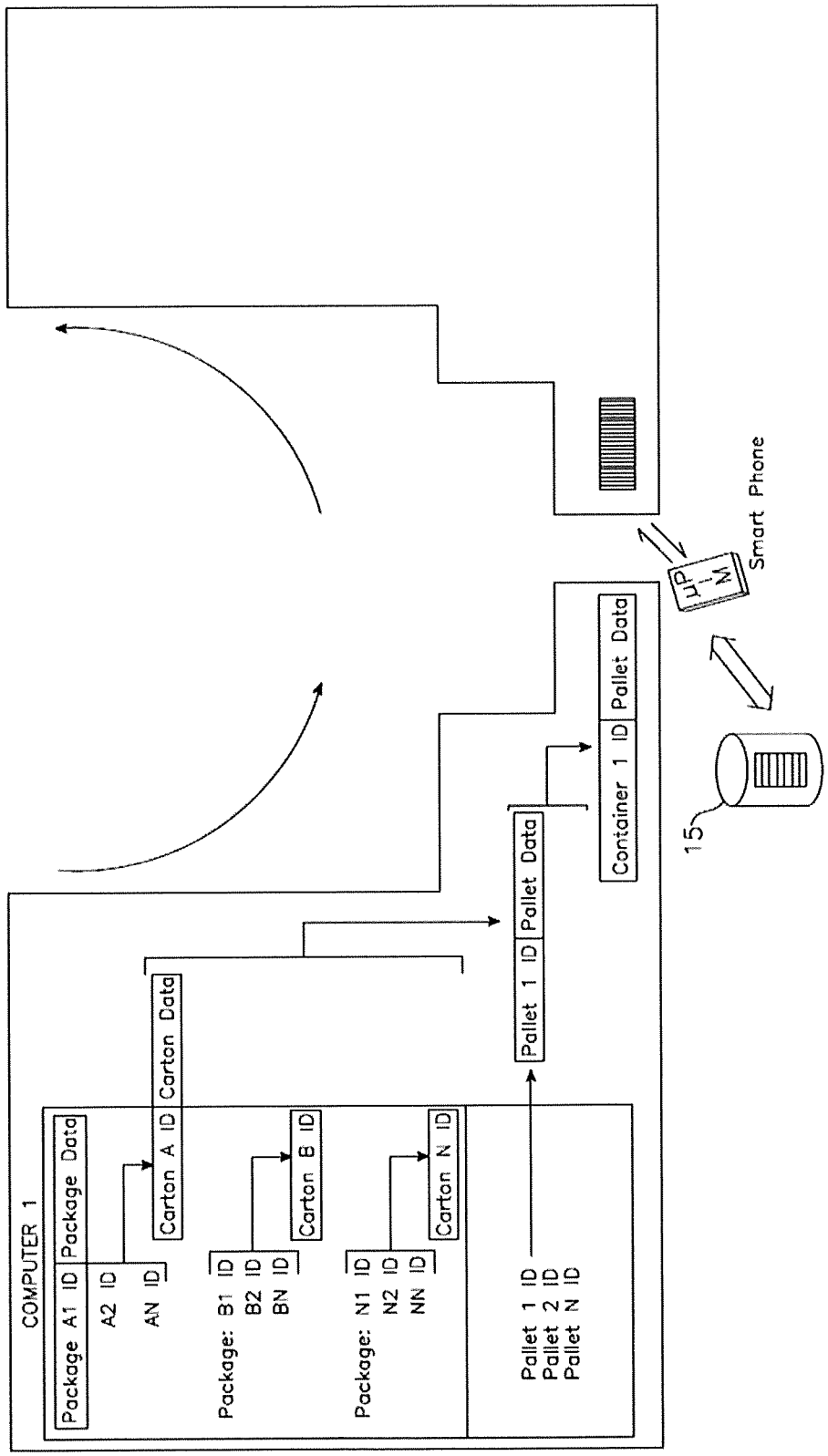
FIG. 1B illustrates an end to end process in accordance with embodiments of the invention from packing steps through transfer steps to unpacking steps.
Figure 1C:
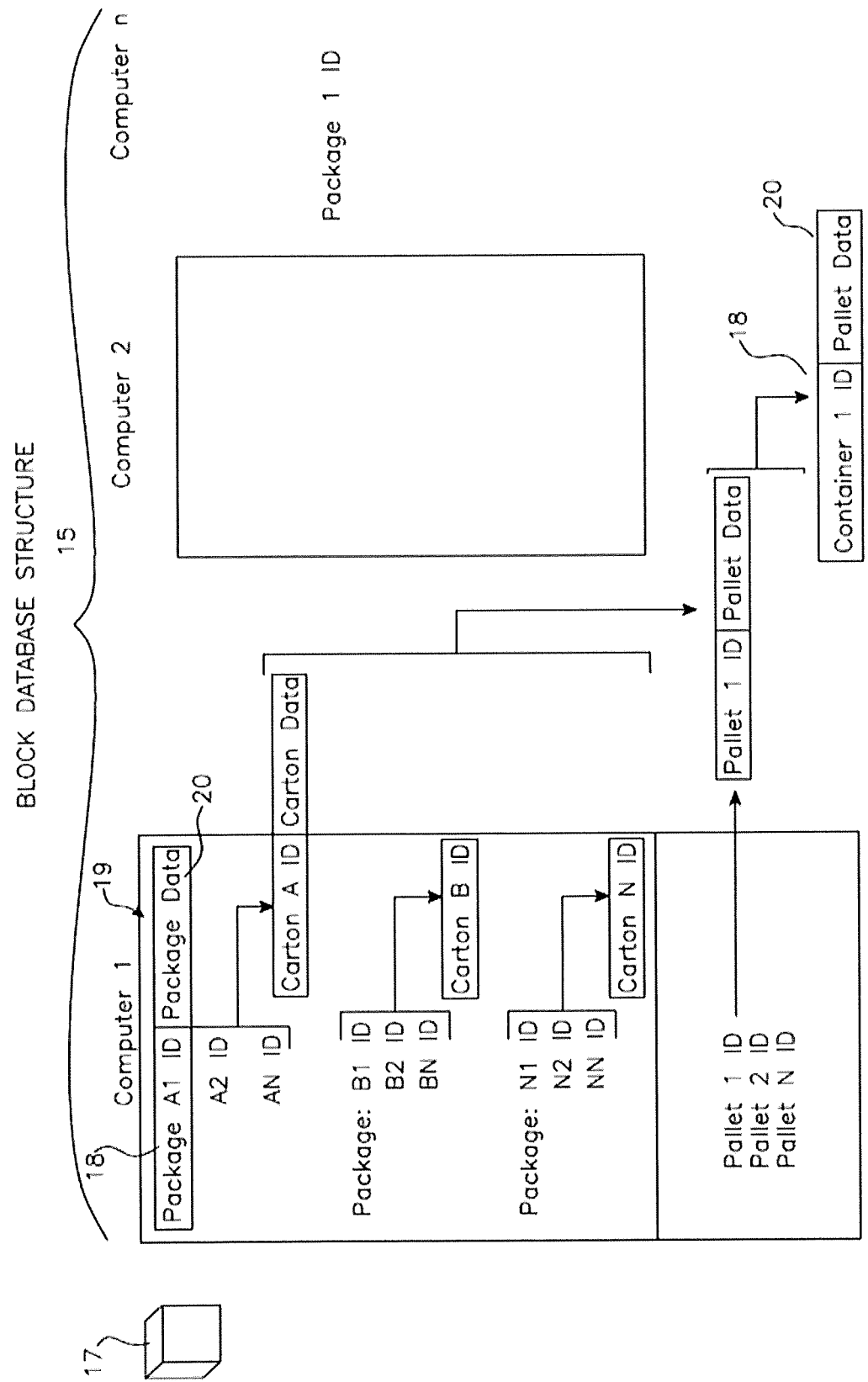
FIG. 1C illustrates in detail the application of element identifiers and sub elements during packing steps of the process of FIG. 1B.

With reference to FIGS. 1A, 1B, 1C the system 10 may operate conceptually as follows:

With reference to FIG. 1B in one form the system 10 involves, broadly, a "packing" step 11, a transfer step 12 and an unpacking step 13.

Relevant data 14 is recorded in and referenced against database 15.

The relevant data 14 is recognised and interrogated by digital devices during the various steps. In one form the digital devices take the form of smartphones or tablets16.

FIG. 1C illustrates in detail one example of a packing step 11.

In this instance an element 17 will have associated physically with it an element identifier 18. The element identifier 18 will be placed in a record 19 which also includes associated data 20. The associated data may relate to the nature of the packaging of the element and in subsequent steps in the supply chain may relate to events that occur during transport of the element 17 either individually or as part of a package component.

In that regard, with reference to FIG. 1B the elements 18 may be encapsulated in a carton which in turn may be encapsulated in a carton which may in turn be encapsulated in a container for conveyance.

The container may be transported involving various events including inspection by Customs and the like before it eventually experiences an unpacking step 13 wherein a reverse process to that illustrated in FIG. 1B occurs.

At steps along the way, a digital device 16 may interrogate the element identifier that is associated physically with the element and then check against data records in database 15.

For the purposes of this patent when we refer to Blockchain, we will mean any data structure in the form of a distributed ledger (whether a centralised, decentralised or a hybrid ledger is implemented and operated) including any adaptation or derivation of such a concept. As an example of the flexibility of this definition, a Blockchain may involve a private blockchain combined with a public ledger.

An individual item, whether each is a discrete item, object or a product ("Item"), can have its authenticity and origin proven when verification information ("Item ID") is displayed or made readable or detectable, within, on or about the Item. The relevant Item's Item ID is then read, checked, matched or otherwise interrogated ("Checked") against the data stored on the Blockchain.

The Item ID may be in the form of a chemical signal, embedded chip, bar code, QR code, signal or any other means ("Code") that will enable the verification information to be extracted, read, detected or to be Checked by any other means.

Throughout this document we will generically refer to placement of the Code in, on or about an Item as being a process where a marker of the individual Item ID would be attached to the relevant Item.

When the Item is Checked, the Code will be checked and verified through the use of an application which may be displayed or deployed on any suitable device ("Application"). The Application will recognise various functions for which a user may wish to have the Code Checked.

The Originator (defined below) will have the option of bundling the Item with other similar Items (with each Item having its own respective Item ID). Equally the Originator may elect to distribute an Item in an unbundled format. In that case, the System would be adapted to still provide verification in relation to the lone Item.

Some Examples of Those Functions would be:

Originator: the person or entity that holds the authority that brings the item's ID into existence and places that Item ID onto the Blockchain.

Custodian: The person or entity that receives the custody of an Item when the Originator transfers custody of the Item through the Blockchain to the Custodian. A Custodian will use the Application to interact with the Blockchain to either accept or transfer the custody of an Item. A Custodian may at any time in turn transfer the custody of an Item to another Custodian who inherits the same right to transfer custody of the Item to yet another Custodian.

Monitor: At any point in time, the Blockchain may be Checked to determine the current custodial status of the Item. A Monitor may be any person interested in the custody of the Item, such as a transporter, shipping agent, ship's crew, port authority, customs officer, warehouse staff etc.

Seller: The Seller will use the Application to interact with and Check data on the Blockchain. The Seller also holds the rights and power to transfer the custody of an Item to another Custodian. It is acknowledged that ownership may not change when the Item is transferred from one Custodian to another. In certain circumstances, the act of sale is akin to the transfer of custody in return for payment. The Seller will inform the Blockchain that the custody (or ownership) of the Item is being transferred to the new Custodian. Whether that person receiving custody of the Item is a new Custodian or a buyer does not matter for the purposes of the System—unless the buyer is a consumer ("Consumer"). If the buyer is a Consumer, a more detailed level of interaction with the Application and the Blockchain will take place. The distinction of how a Consumer interacts with the Application will be explained in more detail later in this document. When any transfer takes place, matters such as agency, custodial rights, escrow, title and ownership will be determined by normal legal methods and will sit outside the System. The System is merely a means of recording of a custodial chain. Neither the Application, nor the System, alters the prevailing legal rights.

If the Item was to be registered on a personal property security register or any other external registry system, the act of registration may be recorded on the Blockchain.

Consumer: the Blockchain can be Checked by the Consumer using the Application. The Consumer has the same rights and power to accept the custody of an Item from another Custodian (who in this case of the sale of the Item would be the seller). Ownership will transfer when the Item is transferred to the buyer/Consumer in accordance with the settled law of the applicable jurisdiction.

The buyer/Consumer will also enjoy title to the Item subject to any rights or limitations that may have been imposed by the Originator at the time the Item was originated and registered on the Blockchain.

An example of such a right would be an expiry date for the Item. After a certain date, the Item may no longer be validly transferred and the Item would be denoted on the Blockchain (if a Check was conducted after that date) as being an expired Item.

Auditor: An auditor or any other interested third party may use the application to interrogate the Blockchain to determine the status of a given Item. This data would include any information recorded on the Blockchain in relation to the Item's origins, rights limits or the Item's chain of custody.

Item ID Origination

The power to originate an Item ID is open to any person who wishes to assume the role of Originator.

Some Originator's may have more complex operational requirements where they wish to authorise members of their approved network to interact with an Item or Items by directly interacting with the data record of the Item/s placed on the Blockchain.

Such authorised network members may include, but not be limited to: transport entities, shipping agents, vessels, warehouse operators, distributors, retailers and public authorities such as customs and quarantine officers.

The Originator may elect to establish a register of approved network members. The register may be a 'central registry' function conducted by the Originator or a trusted third party. The public keys of each network member may be recorded on the Blockchain against the Item ID of each relevant Item. Of course, this authorisation matrix may be segregated, varied or adapted in any way that is preferred by the Originator. The rules (in effect the devolved authority to validly deal with an Item) may be varied for a certain Item or group of Items as best suits the Originator's requirements.

Such a register may be designed to be a further protective measure to limit the power of other persons to validly interact with an Item or indeed, a shipment of Items. Restricting the valid access to a pre-approved network of authorised members may better protect and maintain control over the provenance of an Item. Network members would be authorised to interact with an Item in an approved manner that does not break the custodial chain.

Example: One example would be where a container was being shipped from the factory of the Originator overseas to Australia.

The Originator may establish a set or rules. Those rules may have the flexibility to address less common or infrequent occurrences. That flexibility would maintain the chain of custody and the chain of custody would not be broken if the Australian customs or quarantine authorities opened the container (an Item) for inspection. The authorities may even exercise their discretion to open sub-Items (such as pallets, cartons or packets) as will be outlined in a later examples. The rules may have the flexibility to address such events.

The power issued to the Australian officers would be to use the relevant authority's private key to break a seal (which would otherwise alter the custodial chain if a seal was broken by an unauthorised third party).

The authorities may also have the power to "reseal" (for the purposes of the custodial chain) an Item. The power/authority to reseal an Item may be a power the Originator restricts and does not grant to other network members. Equally the authority to validly unpack an Item may also be restricted. e.g. a retailer may only have the authority to validly open a carton, while the authority to open a container or pallet may be restricted to an authorised distributor who is a network member authorised to exercise that power.

An originator may also sub-delegate certain powers. e.g. a distributor may be empowered to add or remove authorised retailers from the network of members. In such a case the power granted by the Originator may limit the power a distributor can exercise to only relate to a carton. So, a retailer can validly open a carton and display the items on the self for sale.

Devolving this power may, in some circumstances, yield security benefits as the distributor may authorise a specific retailer to be the only entity validly entitled to open an individual carton (Item).

Local knowledge and regular interaction between distributors and retailers may mean this level of control is a useful option the Originator may utilise.

The shipment process will be explained (along with a usage example) in greater detail below.

Concepts

The System may be deployed in many varying ways. One way would be to gather Items together in a small group. A number of small groups would then be combined or bundled into a larger group for ease of handling or otherwise.

A number of large groups would then be bundled together into an even larger group. A number of even larger groups would then be bundled together in a much larger group. This grouping process may continue to any number of levels.

At each level the individual group would receive its own Item ID. For the sake of clarity, it is important to note that a discrete Item ID would be assigned at each grouping level.

When the custody of a group of Items is transferred from one party to another, the transferor must authorise that transfer by pushing the custodial authority to the transferee. That transfer would be performed through the Blockchain.

The transferor would use the transferor's own private key to inform the Blockchain that a transfer of the custody of the particular Item ID was to be transferred to the transferee's public key. This process would be the same whether the Item ID pertained to an individual Item or a given grouping level of Items.

Origination and Distribution Example

With reference to FIG. 1A, a pharmaceutical manufacturer (an Originator) may at the end of the tablet manufacturing assembly line, bundle a certain number of tablets. In such an example, this bundling may be in the form or tablets being encased in a bottle, tablets being encased in foil sheets with those sheets then being placed into a package. Of course, the bundling method or process may be varied as required.

Package: The bundled tablets (bundled into a package for the purposes of this example) would then be assigned an Item ID by the manufacturer/Originator using the Originator's private key held by the manufacturer. A marker of that Item ID would be attached by the Originator to the Item. Details of the Item ID would then be entered into the relevant new Item's (package's) token on the Blockchain using the Application. In this way, the Item would be created and the Item would become an active element or token on the Blockchain.

Carton: The Originator may then bundle any number of packets (each packet bearing its own unique Item ID) into a sealed carton. Once the carton is sealed, the Originator would then assign the carton an Item ID. A marker of that Item ID would be attached by the Originator to the Item. The relevant data would be added to the token of the new Item (carton) on the Blockchain using the Application. The data stored on the Blockchain in relation to that Item ID would denote that this Item was sealed with each of the relevant Items (in this case packets) stored inside that Item (in this case a carton).

Pallet: At the next step of the packaging process, the Originator may bundle a number of cartons onto a pallet and the pallet and piled cartons may then be encased in plastic or otherwise be secured and sealed. Once the pallet is sealed, the Originator would then assign the pallet an Item ID.

A marker of that Item ID would be attached by the Originator to this newly created Item. The relevant data would be added to the token of the new Item (pallet) on the Blockchain using the Application. The data stored on the Blockchain in relation to that Item ID would denote that this Item was sealed with each of the relevant Items (in this case cartons) stored inside that Item (in this case a pallet).

Container: At the next step of the packaging process, the Originator may bundle a number of pallets into a container and the container may then be secured and sealed. When the container is sealed, the Originator would then assign the container an Item ID. A marker of that Item ID would be attached by the Originator to the Item. The relevant data would be added to the token of the new Item (container) on the Blockchain using the Application. The data stored on the Blockchain in relation to that Item ID would denote that this Item was sealed with each of the relevant Items (in this case pallets) stored inside that Item (in this case a container).

There is no requirement for any particular packaging methodology to be followed. The principle is simply that:
- each Item bears its own Item ID;
- a marker of that Item ID would be attached by the Originator to the Item
- the token of the new Item on the Blockchain would have the updated data stored using the Application;
- a bundled group of items is assigned its own Item ID;
- each bundled group would be noted as holding a grouping of the next smaller level of bundled Items (a container would hold x pallets, a pallet would hold x cartons, a carton would hold x packets) with all those details being recorded on the Blockchain).

Origination Rights

At the end of the packaging process, the Originator would use the Application to denote on the item's token on the Blockchain (in this case the container's token) that the container was validly originated by the Originator (including all of the individual Items that comprise the container's contents).

As stated above, the token would also contain any other rights, limits or conditions that the Originator elected to ascribe to that Item or any individual Item (or sub-item) in the chain of Items. The rights, limits or conditions may be ascribed down to the smallest bundling level of Items that had been assigned an Item ID.

Custodial Chain Example

Upon the completion of the packing process the Item (in this case a container) would be formally released for distribution by the Originator. The Originator would use the Application to record that release on the Blockchain.

In practice, the release would take place when custody of the Item was first transferred. That transfer would then be noted on the token for that Item on the Blockchain. It may even be a transfer from the assembly line to the Originator's warehouse facility to await shipping.

Distribution

The private key of the Originator would transfer custody of the token (being the Item ID) on the Blockchain to the transferee (in this case the transport company). It is a fundamental component of this system that only the Originator is able to conduct the first transfer of custody to the transferee. Custody must be pushed by the transferor, it can't be pulled by the transferee.

The transport company will, in turn deliver the Item to the port company with both the transferor (transport company) and the transferee (port company) using the Application to inform and update the Item's token on the Blockchain regarding the change of custody. The rights and obligations of the custody will take effect as it would under any other custody transfer process.

The custodial chain will continue through any number of transfer points, from port company to ship, from ship to port company at the ship's destination, from port company to transport company and from transport company to the distributor's warehouse.

At all stages of the supply chain process, the Item (in this case the container) will remain sealed.

When the seal of the Item (container) is broken the person breaking the seal must use the application to update the Item's token on the Blockchain.

Inspection

Monitors such as customs officials will have the right to inspect and validly open, inspect and re-seal any container (and any sub-bundles). That right may be granted by the Originator at the time the goods were packaged or through any valid update to the Item's data on the Blockchain.

The Originator will be informed of such changes (as much as is permitted by law) through updates on the Item's record on the Blockchain. If any discrepancy in the custodial chain is detected by the Originator then all of the affected items may be withdrawn from sale.

Unpacking

Figure 2:
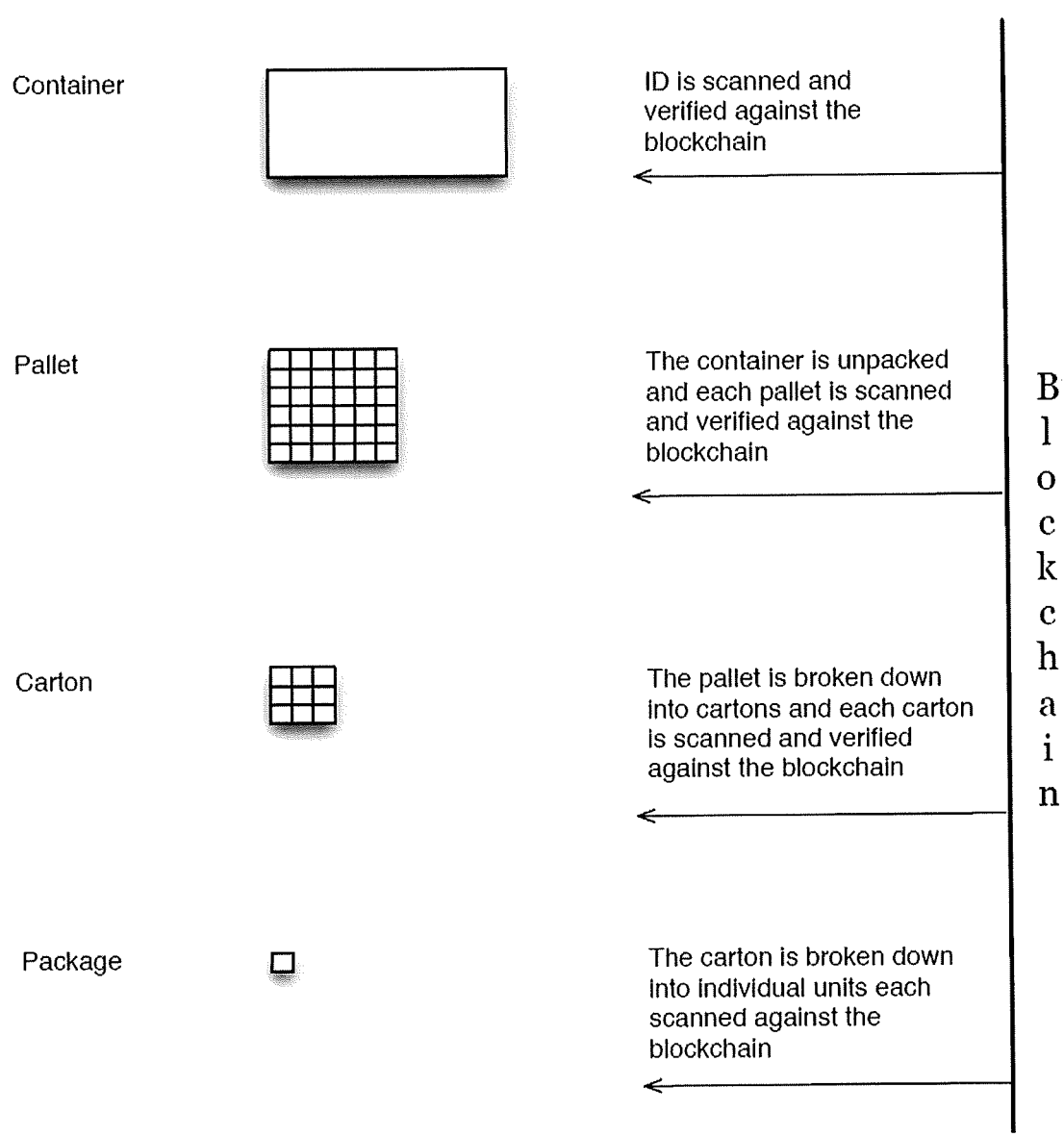
FIG. 2 illustrates an example of an unpacking and verification process

With reference to FIG. 2, the unpacking process may then begin. In that process, an Item (container) will be noted on the Blockchain as having been unsealed and the token of the smaller item level (pallet) would then be activated on the Blockchain. In this case activation means that the Items at that level of the packaging process may then be enabled to have their custody transferred.

A custodial chain for an individual pallet may then occur. Any changes in custody would again take place by both the transferee and the transferor using the application to interact with the Blockchain. There may be any number of changes in the custody of the Item (pallet) with each transfer being recorded on the Blockchain.

The seal of the pallet may then be broken. A similar unpacking process would be noted through the Application with the affected tokens being updated on the Blockchain. This means the tokens of the individual cartons would be activated, thus enabling custody of an individual carton to be transferred. There may be any number of changes in the custody of the enclosed Items (cartons) with each transfer (of a carton) being recorded on the Blockchain.

A transport company may, in turn, deliver an individual carton to the pharmacy. Both the transport company and the pharmacy would then use the application to update the status of the Item (carton) status on the Blockchain.

Display for Sale

The pharmacy would then use the Application to update the carton's token on the Blockchain. The act of breaking the seal of the carton would, in accordance with the rules established by the Originator during the packaging process, activate the item to be validly ready for sale.

The Items would be readied for display on the shelves of the pharmacy. The pharmacy would use the Application to update the token of each packet of tablets on the Blockchain. It would be denoted on the Blockchain that each Item (packet), bearing its own Item ID, would now be validly authorised for sale to a Consumer.

The pharmacy would place and display for sale the individual Items (packets) on the shelves of the pharmacy.

Consumer Protection

A Consumer shopping in the pharmacy can then use the Application to verify the authenticity of the Item (packet) displayed for sale by the pharmacy.

Verification

Figure 3:
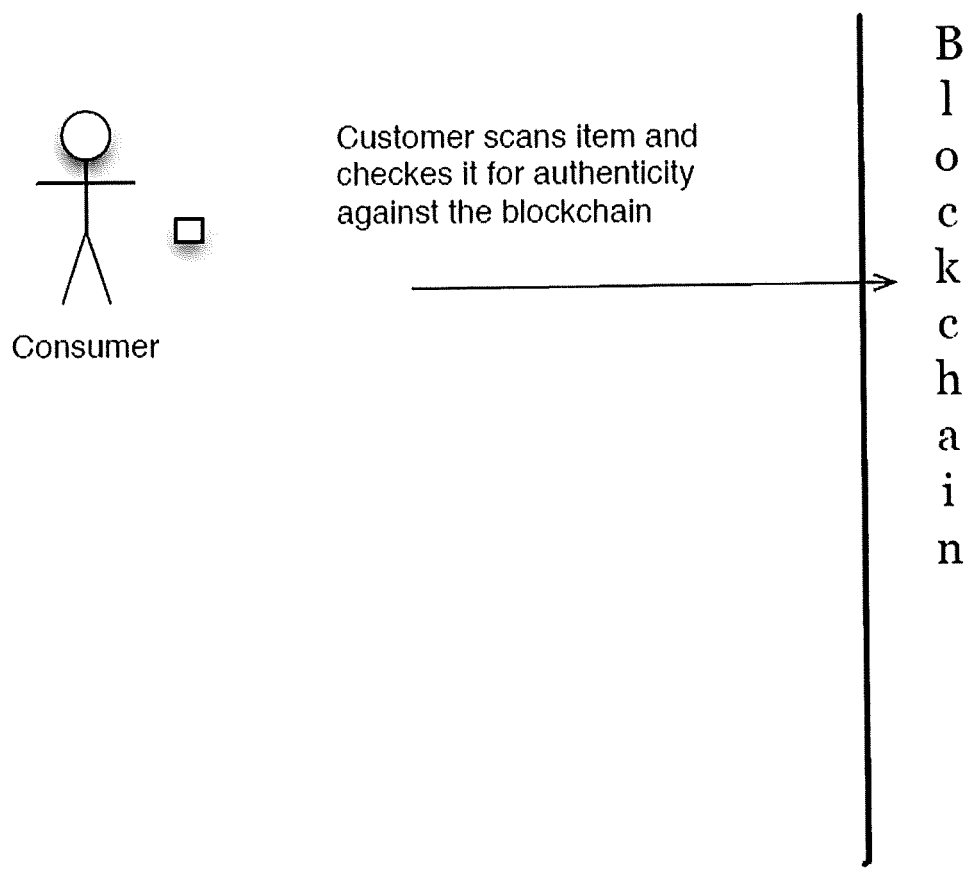
FIG. 3 illustrates a scanning step utilising a digital device

With reference to FIG. 3, the Consumer will use the Application to read the Item ID of the packet they are considering purchasing. The Application will analyse the data stored on the Blockchain in relation to that individual Item.

The consideration performed during the analysis will include, but is not limited to, an analysis of:
- whether the Originator is an entity registered with the Application;
- whether the valid private key of the Originator was used;
- whether the Originator has given notice to the Application (through the Blockchain) that an irregularity has occurred in the packaging or shipping process;
- whether the Originator has recalled the product and the Item has been withdrawn from sale;
- whether there has been any irregularities detected by the Application (through the Blockchain being Checked) or reported by the Originator or any third party during the supply process;
- whether the pharmacy, being the base (or sales level) unpacker in the custodial chain has authorised the product (by using the Application to verify the product was authorised for sale when it was placed on the pharmacy's display shelf);

This authorisation step may or may not be required.
- whether the token for the individual Item has previously been spent (double spends of an Item's token will not by permitted by the Application) e.g. by the item having been sold through a point-of-sale device or any other process that means the item has reached the end of the supply chain for that particular item.

Verification Confirmation

If the analysis of the data stored on the Blockchain in relation to the relevant Item ID does not detect any anomaly, the Consumer will be informed that no defect in the title of the Item was detected on the Blockchain. A message (or image such as a tick) will be displayed on the Application.

Verification Rejection

If the analysis of the data stored on the Blockchain in relation to the relevant Item ID does detect an anomaly, including if the product has been recalled or withdrawn from sale, a message (or image such as a cross) will be displayed on the Application.

Point of Sale

If the verification was confirmed, the Consumer will then take the Item to the counter to offer to purchase the Item. At the counter, the pharmacy will be entitled to sell/transfer the Item to the Consumer.

The pharmacy/seller will use the Application to transfer/sell the Item to the Consumer.

In order to sell the Item the pharmacy in a preferred form may be the holder of the correct private key associated with the already verified custodial chain for that Item.

That same private key must have been used to designate the product as being ready for sale when the Item was placed on the display shelf. That display for sale process, will be enabled if the same private key was used to update the Blockchain when the seal of the carton was broken.

Consumer Warnings

The Consumer must be informed to only buy an unopened packet (as is standard practice).

The Consumer must be warned that while an individual packet may be a copy, no more than one packet bearing an individual Item ID can ever be validly sold. The limit to only sell one counterfeit item is a very unattractive proposition for a counterfeiter. The amount of effort and cost that would have to be expended per item would be a strong disincentive against copying.

Double Spends Prevented

Further protection for the Consumer will be provided as the Application will check if any packet from the respective carton has ever been sold in another location. If that is the case, the Consumer will be warned that the Item ID has not been satisfactorily verified (if this is a setting or condition chosen by the Originator).

Anomaly Reports

If any anomaly related to a particular Item ID is detected by the Application, the Application will update the tokens of all Items in the next bundling level up (in this case a carton). That update will mark all unused Items in that bundle (carton) as being suspect due to a detected anomaly. The upwards notification of the anomaly would continue to cascade up the supply chain in accordance with any notification rules established by the Originator at the time the relevant Item was originated.

The Originator would receive direct notice of the anomaly in accordance with the notification settings set by the Originator.

Anomaly Consequences

As an added measure of Consumer protection, once an anomaly is detected, all related (carton level) Items will no longer be saleable (if that is the anomaly response selected by the Originator).

Another feature is that if an anomaly is reported on one item, then that anomaly report should affect the associated items in either the carton, pallet or container depending on the prevailing circumstances. e.g. if we used the traffic light concept: All items would have ' green status' until an anomaly was detected over one item. That detection should turn the status of the entire carton to 'amber status'. If further anomalies were detected then at a certain level of anomalies and depending on the anomaly pattern the further detection should create warnings for the entire carton, pallet or container that may result in all the items associated with that carton, pallet or container being marked red and being listed as either spent items or item not suitable for sale or supply.

The carton may then be withdrawn from sale by the pharmacy and returned to the manufacturer/Originator for a refund. This capability is an optional feature that is one of the rights the Originator will have the power to impose (or elect not to impose) at the time the Item is originated.

Conditionality

A further ability the Originator may elect to exercise is the power to attribute a specified condition to an Item or to require certain conditions to be met in relation to a given Item or group of Items.

Such conditions may relate to temperature, location or any one of numerous other conditions the Originator may select ("Condition").

Temperature Condition Example

This is an example that shows how the System may be used to show something did not happen. i.e. satisfaction of the Condition (because the Condition was not breached) is determined and recorded against the Item's ID on the Blockchain.

Figure 4:
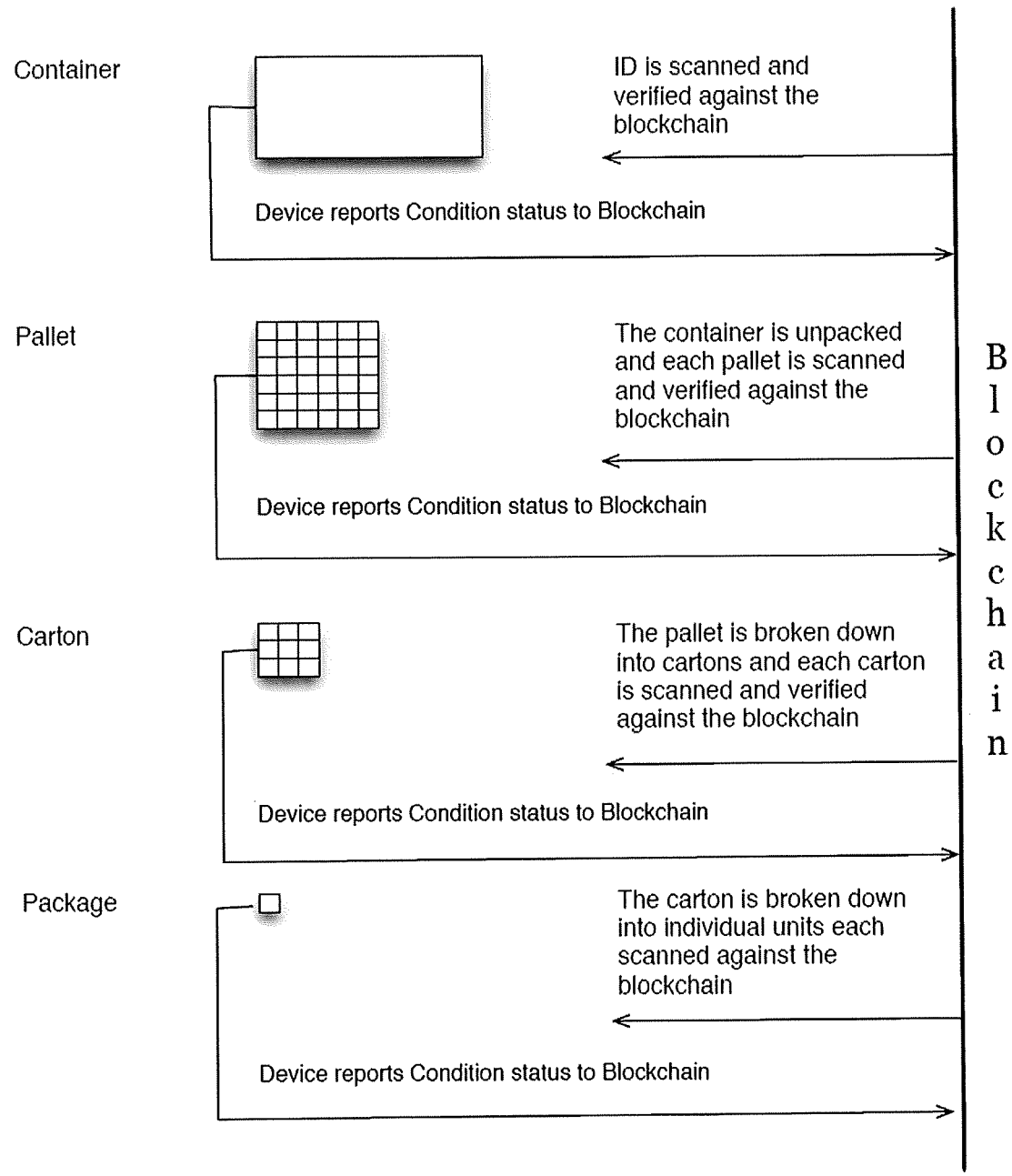
FIG. 4 illustrates a package condition process

In summary, with reference to FIG. 4, a Device is installed in or on the Item and the Originator.

The Device matches the Item to the relevant Item ID on the Blockchain. Checking the Blockchain for data stored in relation to a given Item ID may be part of the custody transfer process.

The Device in accordance with Originator's settings, reports a state (e.g. which may included the satisfaction or breach of a condition).

The Originator may be a meat packing business that requires its shipments to be transported and delivered with the optimum temperature range for the container (Item) having been maintained during all relevant times in the shipping process.

A sensor/device ("Device") may be installed in or on the Item and the Originator may match that Item to the relevant Item ID on the Blockchain.

A Device would report a state (which may included the satisfaction or breach of a condition) at a given point in time and add that data to the Blockchain so that data can be later retrieved and determined.

The Device may be read by any person accepting custody of the Item as set out in the previous example. The ability to read the Device would primarily depend on:
- the location of the Device (being within, around or on the Item);
- the ease of access to the Device; and
- the Originator's chosen access, security and anti-tampering protocols.

Alternatively, the Originator may elect to only have the data read at the final distribution point. At that time, the Device may be read to determine if the Condition was satisfied at all times during the shipping process.

Stated another way, the Device may be read (with the outcome of that Check being recorded on the Blockchain) to determine if the shipment was kept within the required temperature range at all times during the shipping process and the shipment was therefore suitable and safe for sale and consumption.

An advantage of an intermediate Check or verification of the status of Device and whether the Condition remained satisfied is that liability may more effectively be determined if a breach of the Condition resulted in loss or damage or any other claim related to the Item.

An intermediate Check on the status of the Device may help identify a range of pertinent data. Some useful data may be to indicate:
- where a Condition was breached;
- the cause of the breach; and/or
- the entity liable (a central registry, as discussed above, may assist in this process though it is not strictly necessary) for the breach.

An entity may be deemed liable for the breach either as a function of:
- an act;
- a failure to act; or
- as a function of their custodial duties.

In the third instance (re custodial duties), some of the data the Device may be enabled to record/display/indicate/report may include:
- the time of the breach;
- the relevant period between Check A and Check B (when the record of the Device's data stored on the Blockchain indicates the period or shipment stage in which the Condition was breached); or
- the shipment stage in which the breach occurred.

Location Condition Example

Figure 5:
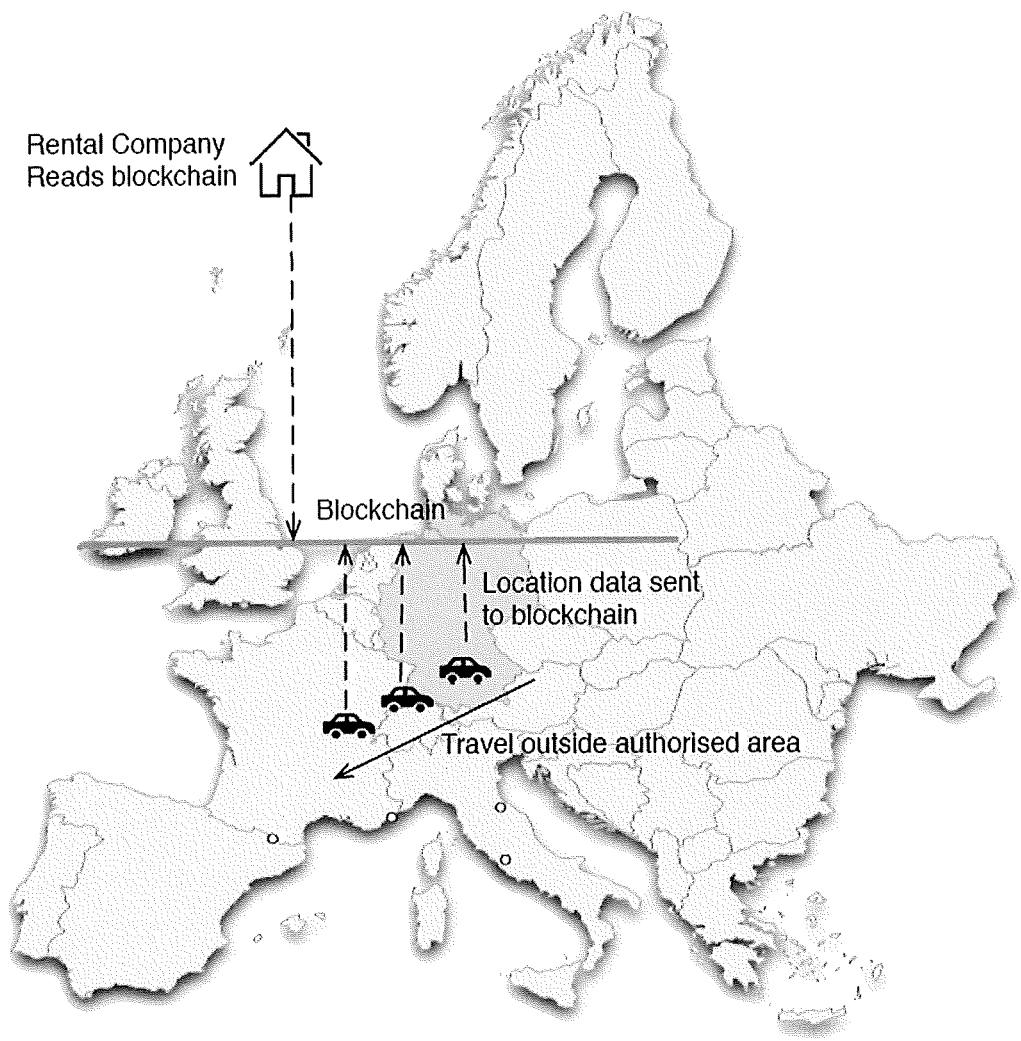
FIG. 5 illustrates a location reporting process and FIG. 6 illustrates an identification of an anomaly in the form of an unauthorised item process.

With reference to FIG. 5, there is shown an example that shows how the System may be used to show something did happen. i.e. a breach of the Condition is determined and recorded against the Item's ID on the Blockchain.

Some of the other conditions we may check for are shock (was the container dropped, light (was the item opened), vibration, humidity, contamination by radiation or foreign chemicals), moisture etc In this example the Originator is a car rental company that has restrictions on where their vehicle may be taken during the hire period. For example, due to insurance requirements, the hirer may be prohibited from taking the vehicle into country X. It is clearly stated in the car hire agreement that taking the vehicle into country X would breach the conditions of hire agreed between the car company and the hirer.

A Device may be installed on or in the vehicle (Item) by the rental company (Originator) to retain a record of the Item's location at all times during the relevant hire period. For record verification, that Device may periodically update (e.g. daily) the data record of the Item on the Blockchain.

Alternatively, the Item may be authorised to immediately report any anomalies (that the Device detects) against the Item ID recorded on the Blockchain.

The authority to report/record data on the Blockchain against any given Item ID may be delegated by the Originator to either the Item, the Device or both.

When the vehicle is returned, the Originator may check the Device and/or the data record stored on the Blockchain in relation to the relevant Item ID to determine if the condition was breached.

The Originator may have originally charged a condition compliance premium from the hirer. If the Condition was not breached, the Originator may return that premium amount to the hirer.

Unauthorised Package Inserted or Substitution

It is possible for the custody protocol being set by the Originator to be "do not accept custody of any Item if the Item's seal has been broken by anyone other than a Monitor."

Figure 6:
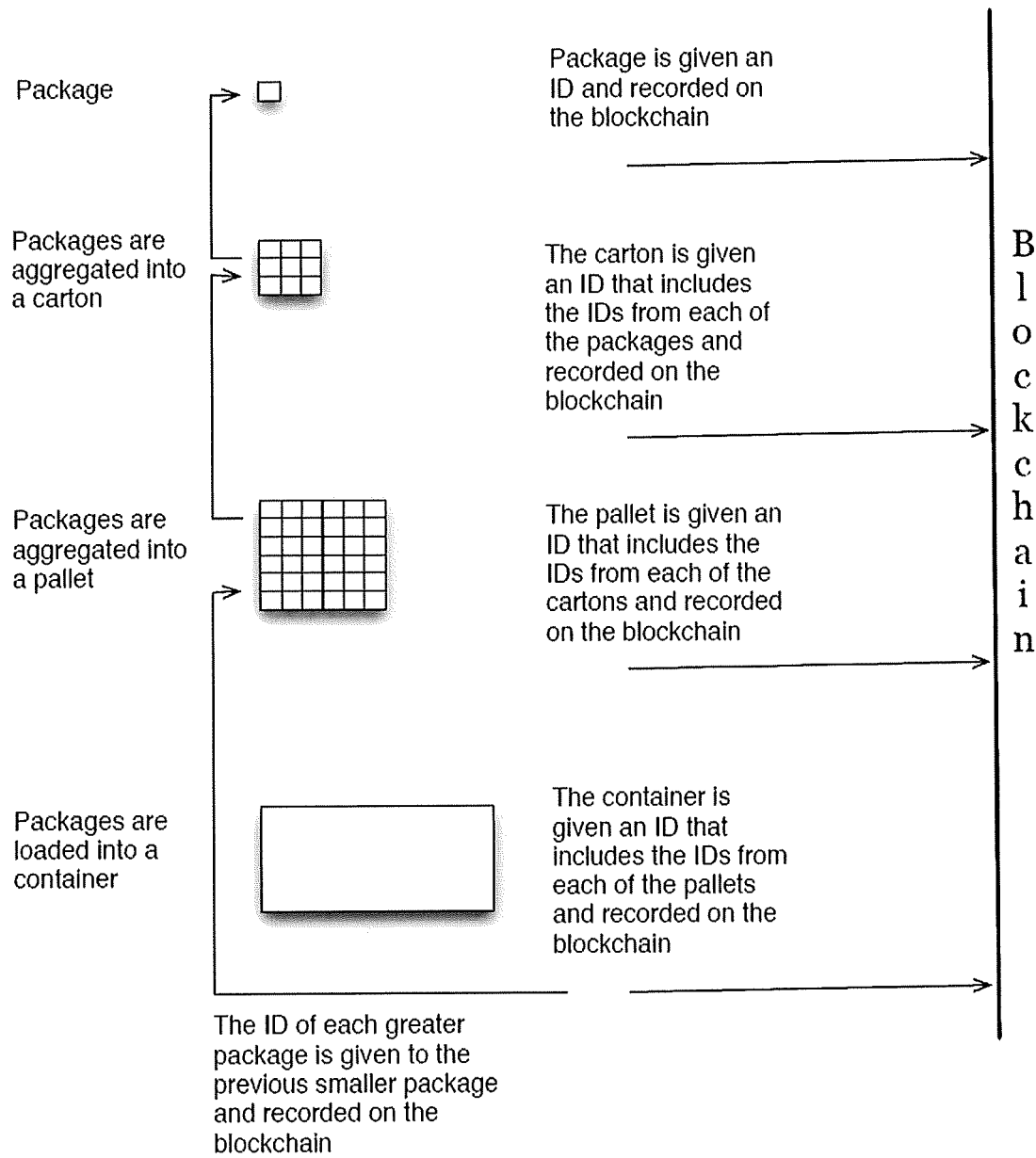

With reference to FIG. 6 and a means of doubling the protection, the following procedures may also be followed.

By recording the larger package ID against the smaller package it is possible to prevent unauthorized packages being inserted into an already aggregated package.

One use for this might include tainted goods included in what would otherwise be an authorized shipment.

If a package is swapped out it will not have the ID of its parent package.

Further Examples

Fashion House Example

A fashion house concerned about supply chain integrity and ethical clothing, may obtain proof that workers were fairly paid and no child labour was involved in the production process. At present that system is difficult to enforce because the records are held by the factory and there is considerable scope for false records to be created or for records to be altered.

If the System was used as part of a blockchain-based supply chain, then the fashion house may audit an unchangeable set of records about hours worked, salaries and factory output. If workers were paid in a digital currency such as Bitcoin and that payment process was integrated into the System, there would be an immutable record of those payments.

In the future, the currency may be even be the digital currency of a sovereign state.

Regardless of whether a nation state issued digital currency or some other digital currency was used, the record of payment may be a verifiable and auditable fact. With the surge of interest in blockchain technology, many companies are working on verification tools that can mine blockchain records. It will be increasingly possible for other important data to be analysed and confirmed. The System may be integrated into those processes.

Equally, consumers of those items would also be able to interrogate the System (using the unique ID of the garment they purchased) to verify that the clothing, footwear, handbag or another item was ethically produced.

Industry Regulator Example

There is an increasing recognition of the importance of protecting regional brand reputation and authenticity.

The threat of fake or counterfeit products is clear. Counterfeiters are misappropriating a brand reputation for quality and reliability. Those market traits have considerable value and that worth is the very reason the counterfeiters are attracted to the brand. Often that brand reputation has been earned and built over decades or even centuries of hard work. It can easily be eroded or destroyed if fake or sub-standard product penetrates the supply chain.

The System can be used to provide regulators with insights into the particular supply chain. Through the System the regulator may determine the source and quantities of the raw materials and audit the volumes being distributed.

If we take wine for example: a wine regulatory body may look at the records of the quantity and origin of grapes being delivered into the production chain and then determine the volume of authenticated wine that may be produced by the relevant bottling facility. Transparency and auditability would preserve the integrity of the region's brand reputation.

When combined with our food safety example, the System may be used to issue each bottle with a unique ID that can then be tracked through the entire supply chain to the store shelf. The consumer interested in buying a bottle of wine can scan the code on the bottle using the System's app and confirm that there are no supply chain threats detected and the bottle is indeed genuine wine produced in the region stated on the bottle.

Artwork Collector Example

Under the Artist Resale Royalty Scheme, the Copyright Agency of Australia has been appointed by the government to collect royalties when artworks are resold and to distribute those royalties to the relevant artist.

A combination of embodiments of the present invention as described herein and digital currency can automate that system providing immediate payment to the artist when an item is sold. That process would be underpinned by fully transparent and auditable accounting records.

As mentioned above, the System may be used to generate a unique ID that is assigned to each artwork. That ID would confirm the provenance of the artwork from the time it was created through its entire ownership history—an important evidentiary trail for matters concerning authenticity, proof of ownership and it would also be a formidable fraud protection measure.

Recycling Example

A manufacturer may be required by law (or in compliance with their own internal ethical production practices) to track the existence of items they have sold. Some major international furniture stores already have a pilot program running to repair or recycle furniture.

In Australia, a major international furniture store already has processes in place for the recycling of cardboard boxes and paper packing, light bulbs, batteries and mattresses. It seems reasonable to assume that more products will be added to that list over time.

The System may be used to assign an ID to each of these items and that identity may be traced from manufacture, to sale and finally to recycling or disposal.

The record keeping immutability and certainty of blockchain data would be useful in this process. As mentioned in other examples above, the ability to make payments using a digital currency may also be integrated into this use of the System.

Air Freight Example

A manufacturer may also elect to distribute their products by air freight. The same principles would apply to air freight as would apply for marine cargo. The Originator would use the System and apply the encrypted ID to the Item that would then be placed into a carton that was similarly identified. The cartons would be loaded into an air container that was also given an encrypted identification.

The air freight supply chain processes would be similar to the shipping supply chain. A trucking company would collect the packed container from the Originator's warehouse and deliver the identified cargo to the terminal which would in this example be an air port rather than a sea port.

Then, the air container would be identified similarly to a sea container and then it would be loaded onto an aircraft.

The path from the destination airport would be similar to the processes used for sea shipments from port to store.

Online Example

Figure 7:
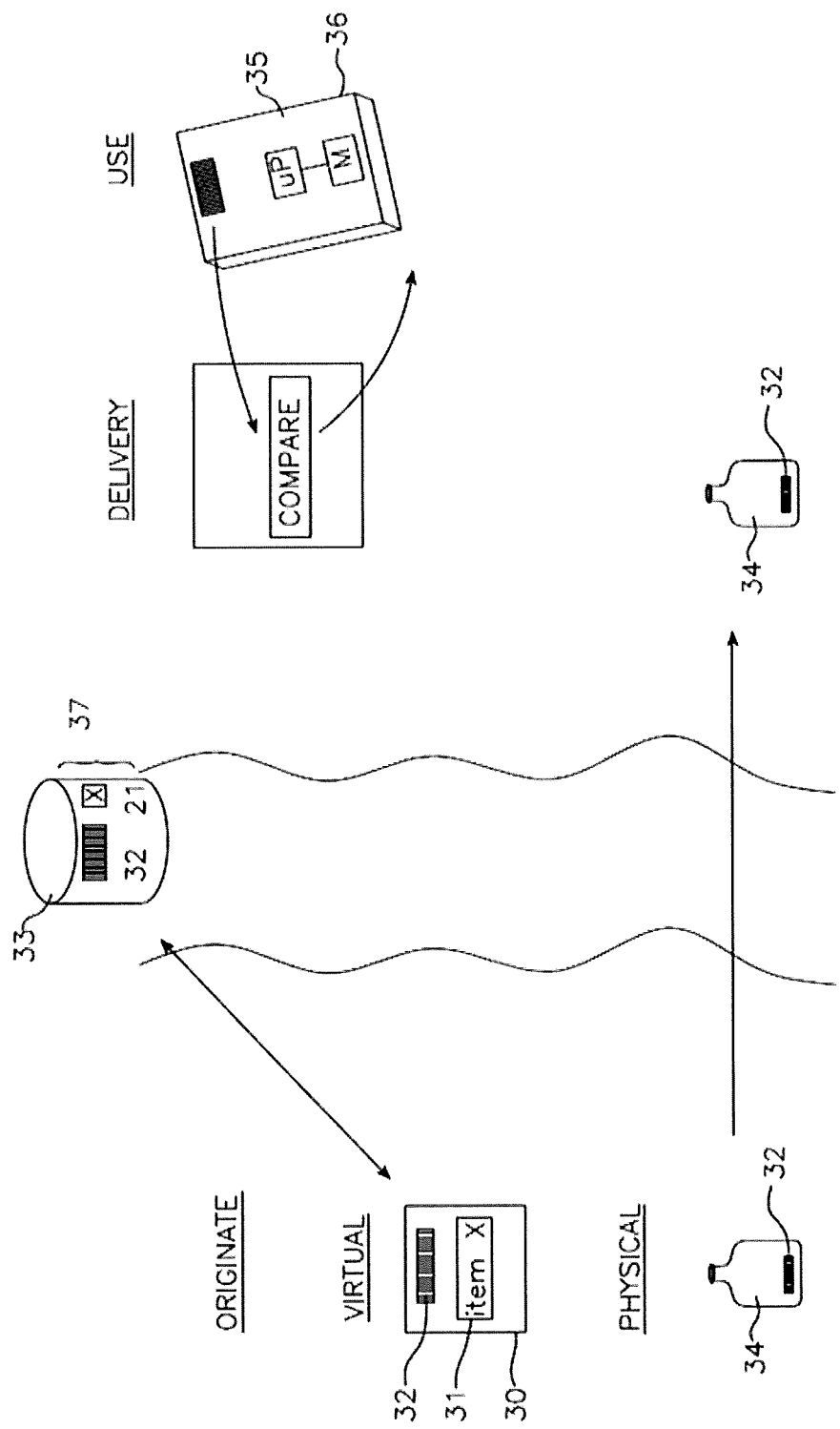
FIG. 7 illustrates a further example of the system applied at the granular level to control of individual items.

Items sold online may also use the System. FIG. 7 illustrates a further example of the System applied at the granular level to control individual items.

With reference to FIG. 7, a user may purchase an individual item from a specified entity the facilities the sale on a website or mobile site. The individual item has associated with it a code. On receipt of the actual item, the user may use the Application to enter the code associated with that item and receives verification that the code is a genuine code associated with the genuine item and confirmation that the code has not previously been 'spent' or extinguished.

Once the system registers that the enquiry has been made and answered, the code is then extinguished from the system or otherwise not made available for reuse.

High Value or Resale Items

For example, a high value item or an item that is intended for resale by consumers may be tagged with a code to the effect "do not extinguish" with the end result that the identifier will be retained on record indefinitely.

That is, in certain circumstances, the Originator may inform the buyer that the code will not be extinguished. This method would be used where the item was a collectible or other asset type where a historical record of a chain of custody may be important or useful. In these circumstances, different protocols would be applied by the Originator to the code associated with the item. A chain of ownership would commence when the item was shipped and each subsequent custodial change (which may include changes of ownership) would be recorded against the item's code.

With reference to FIG. 7, a purchaser may visit a site 30 having available thereon item 31 (represented virtually) for sale (in this instance designated item X). There will be associated with item 31 a unique code 32 (in this instance designated code X). The code will not be available to the user by way of the site30 but will be stored on server 33 referenced against item X.

The physical item 34, being the fulfillment of virtual item 31, may have associated with it physically code X. On delivery of physical item 34, a user may use an application 35 executed on a digital device 36 to read the code X and to compare code X with the code stored on server 33. If the codes match, then the user may be confident that the physical item 34 originated from the originator and is therefore genuine in the sense that it has been supplied directly by or with the sponsorship approval and control of the originator responsible for site 30.

In preferred forms, a lookup table 37 is maintained on server 33 for a wide array of goods or items. In preferred forms, the lookup table is maintained in a blockchain structure maintained by and accessible across a multiplicity of servers 33.

Further Embodiments

Figure 8:
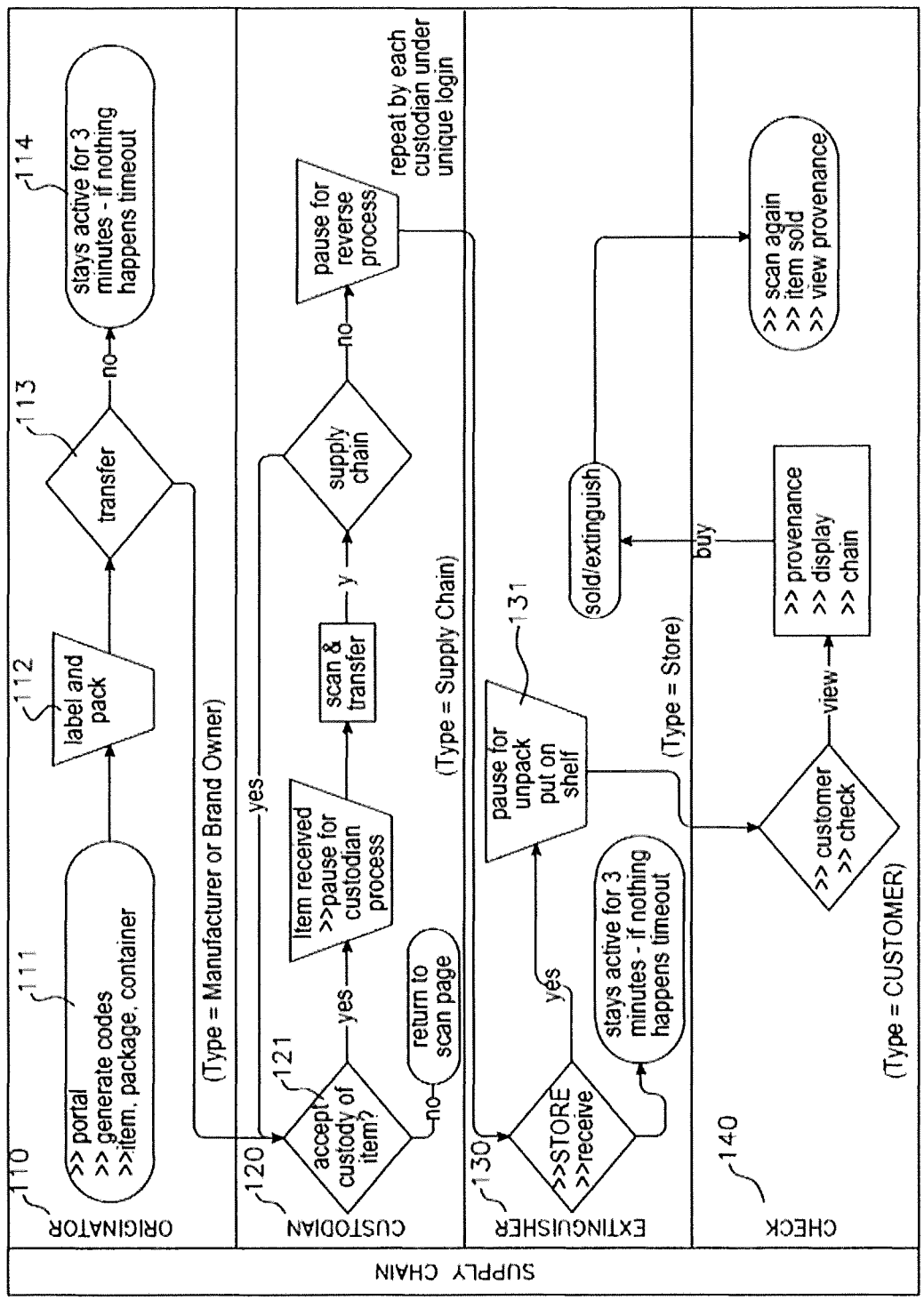
FIG. 8 illustrates a further embodiment of the system applied at the granular level and incorporating a timeout facility.

FIG. 8 illustrates a further embodiment of the system applied at the granular level and incorporating a timeout facility.

With reference to FIG. 8 there is illustrated a flowchart of an exemplary implementation of the previously described embodiments.

In this instance an originator 110 prepares elements and assigns element identifiers in a generation step 111. The elements are then aggregated and packed in a packing step 112. The aggregated (and packed) elements are then made available for transfer to a custodian 120. In this instance the transfer step 113 is available to be executed only during an active window 114. The active window 114 comprises a predetermined time out period. In a preferred form this time out period may be, for example, 3 minutes. If the transfer step 113 is executed within the active window 114 then the goods are recorded as transferred to the custodian 120. The custodian must record acceptance of the item at an acceptance step 121 resulting in data entry into the custodial chain.

The aggregated elements are then de-aggregated in an unpack step 131 as part of an extinguisher step 130 in the supply chain sequence. The de-aggregated items are then checked in a checking step 140 whereby each de-aggregated item is checked for authenticity.

More specifically with reference to FIG. 8, 9, 10, there is described a time-out process. If the recipient does not accept the item within the sender activating the custodial release of the item, then the release simply lapses. It must then be reactivated by the sender.

The person with custody of the item will continue to hold the item until they transfer custody. If that person scans the code they are presented with the choice to either transfer the custody of the item or to cancel.

The person wishing to receive custody of the item will upon scanning the code be presented with a message that custody of the item is held by someone else. This all changes once the custodian has activated a transfer of custody. Then a scan will present the person with the option to accept or reject custody of the item. Again, they must take this action within the time-out period (currently set at three minutes)

This facility is used to advantage when implemented as an application on a hand-held device. In a particular form it may be implemented as an application on a smart phone. In a preferred form there may be two versions of the application for use in different contexts. One is a supply version used by originators, custodians and other entities involved in the supply chain.

The customers will use a bare-feature consumer app. It is not capable of transferring custody. However, it does set out the history of the supply chain movements for the particular item being scanned. It also sets out a history of items that have been scanned.

An important feature of the app design for the supply version is that it may simplify the user interaction.

In preferred form a user cannot do anything that is not permitted according to their categorization in the supply chain.

The person with custody of the item will continue to hold the item until they transfer custody. If that person scans the code they are presented with the choice to either transfer the custody of the item or to cancel.

The person wishing to receive custody of the item will upon scanning the code be presented with a message that custody of the item is held by someone else. This all changes once the custodian has activated a transfer of custody. Then a scan will present the person with the option to accept or reject custody of the item. Again, they must take this action within the time-out period (in preferred forms set at three minutes)

Figure 9:
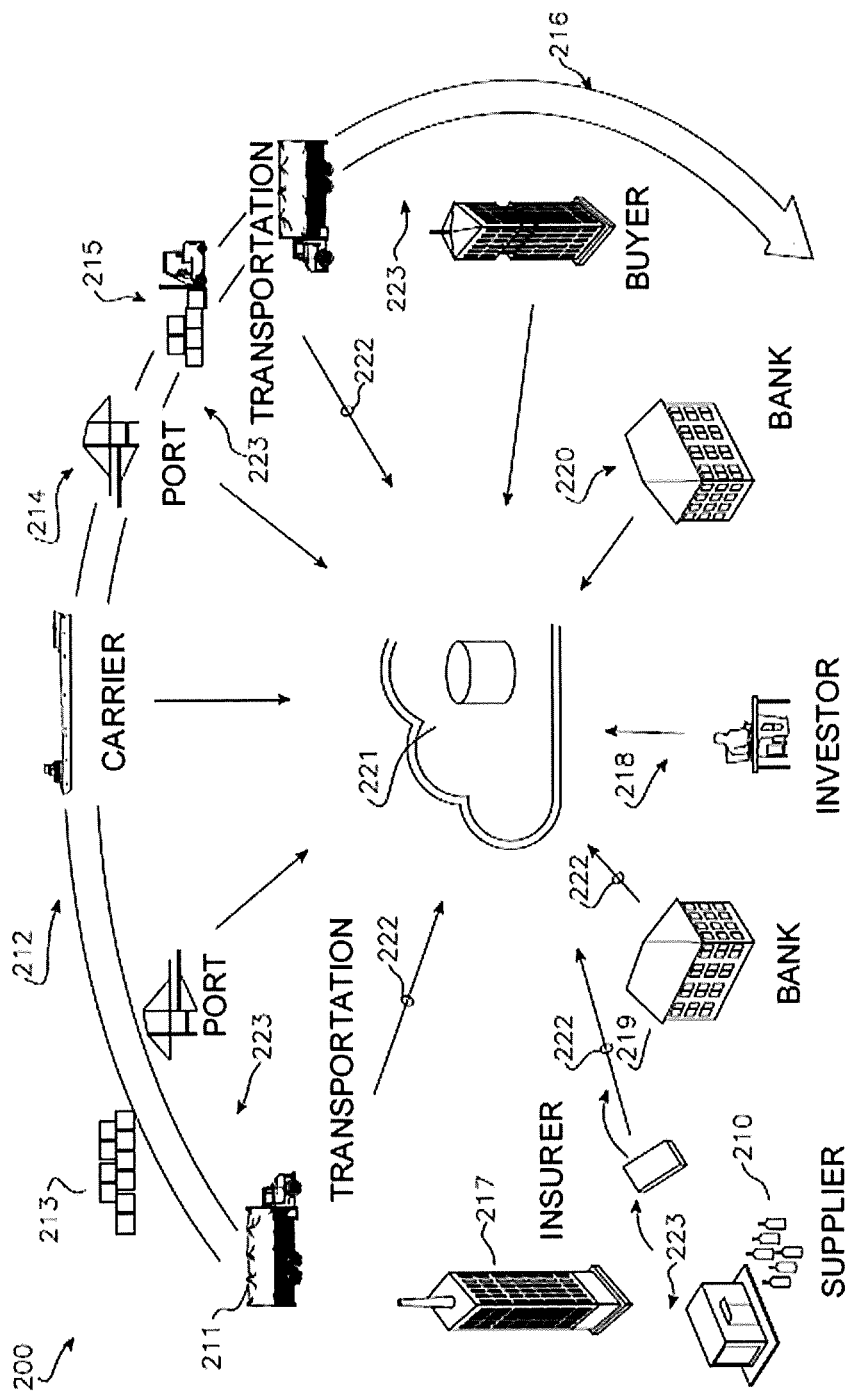
FIG. 9 illustrates a further exemplary embodiment of the system of the present invention

FIG. 9 illustrates a further exemplary embodiment of the system of the present invention.

In this instance the system 200 is exemplified by a relatively complex supply chain comprising physical processing components including manufacturer/supplier 210, first transportation 211 (land-based), second transportation 212 (sea based), mechanical handling 213 between the first mode of transport and the second mode of transport, further mechanical handling 214 between the second mode of transport and a third mode of transport 215 and a buyer/consumer 216.

In addition there are virtual supply chain components including insurer 217 investor 218, first bank 219 and second bank 220.

A database 221 receives granular data 222 from all steps along the supply chain including but not limited to at the point of transfer 223 from one component in the system 200 to another component in the system 200.

In preferred forms a hand-held data acquisition device 224 as described in earlier embodiments is utilised in at least some points in the chain including in at least some points of transfer 223 to acquire the granular data 222 for communication to database 221.

Figure 10:
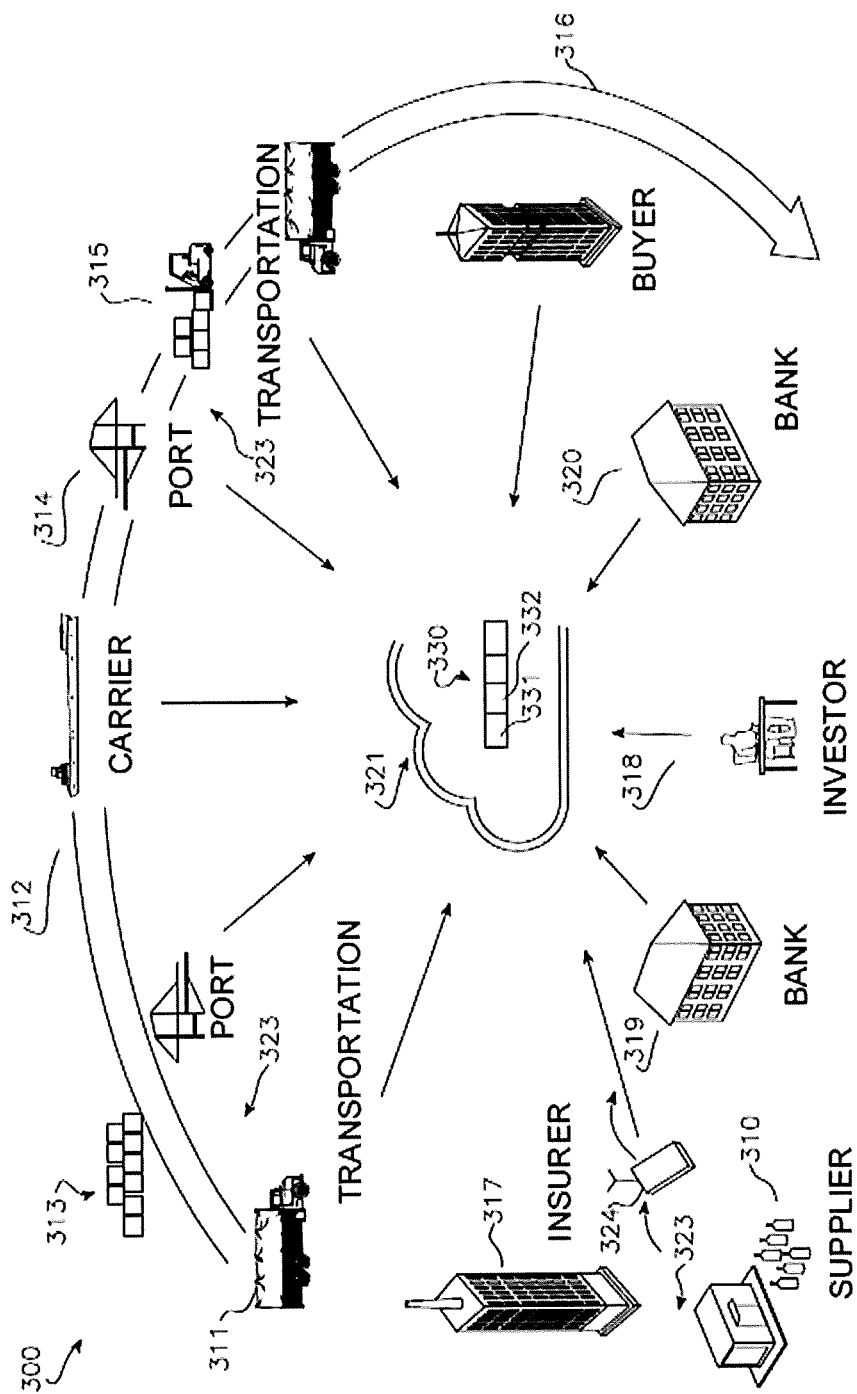
FIG. 10 illustrates yet a further exemplary embodiment of the system of the present invention applied in the context of selective data retention and selective data availability.

FIG. 10 illustrates yet a further exemplary embodiment of the system of the present invention applied in the context of selective data retention and selective data availability. In this instance like components are numbered as for the embodiment illustrated in FIG. 9 except in the 300 series. In this instance the database 321 is supported by a reception of extended granular data 322 combined with additional data feeds in the data structures of the database 321 whereby the data records are segmented whereby selected portions of data record 330 are available to users of the system 300 on a selective basis. So, for example, a first user may be able to access only record 331 of the data structure 330 whilst another user may be permitted to access records 331 and 332. In some forms the accessibility to a record will be based on an additional parameter to identity—it may include time for example. Alternatively or in addition it may be based on the location of an item along the chain. That is data in selected fields may be available only whilst an item is, for example, located between a first point of transfer and a second point of transfer.

With particular reference to the arrangement of FIG. 10, and by way of exemplification of it; the system, 300, makes use of information stored progressively in a database—in preferred forms as a distributed ledger—more preferably of the Blockchain type. The purpose of the system is to verify the contents, security and location of a shipment of items ("System"). It uses information gathered as an item moves along a custodial chain of handlers who pack, store or transport that particular item. It does not matter to the System how many custodians hold and later transfer the item.

The System is concerned with the following information ("Shipment Information"):
1. certainty about the identity of one or more items that may be grouped and packed inside a carton and/or pallet which are then placed into a shipping container either for land, sea, rail or air freight;
2. gathering, storing, disseminating and using information about the container and its contents as a whole;
3. certainty that the content of the container remains intact or that any changes to those items are known; and
4. certainty about the location of the container.

External Use of the System's Information

The System allows its customers to access the Shipment Information and to make commercial decisions based on that information.

The commercial decisions may relate to decisions related to finance, insurance, legal, or other business issues.

The System provides information about 'what' is 'where' and 'when'. The System also confirms that the 'what' remains unchanged during the movement of the container along the supply chain.

Contract Data Construct

A contract data construct is a term given to a data construct that is stored on the database, 321. Data entered into the data construct, 330, is shaped by legal processes and concepts to form a method to partly or fully automate contracts ("Smart Contract"). That automation capability may mean that a number of parties are involved in the contract.

Those parties to the Smart Contract may also elect to share some or all the data they individually enter. The data may be entered into the hand-held data acquisition device, 324, at points along the supply chain, for on communication to the database, 321. This information sharing may eliminate information duplication as it may eliminate or minimize the repetitive input of similar or identical data by each party into their own data systems.

The concept of Smart Contracts may be reliant on the existence of certain information that triggers the contract's specified action. In the case of a Smart Contract for the supply of goods, the contract's provisions may be triggered and the ownership of the goods may then pass from the seller to the buyer. Intrinsic to that change of ownership may be the change in liability and insurance risks that may happen at the same time.

Any insurers, banks, law firms and accountants that are party to the Smart Contract will have an interest in the effect of the provisions of the contract being triggered in ownership and liability be passed from the seller to the buyer.

Other parties who may participate in a Smart Contract and the related supply chain would be packaging companies, manufacturers, warehouses, logistics companies and brokers, trucking companies, distributors and stores. Depending on the mode of transport, rail yards, railways, shipping lines, sea ports, airlines or airports may also be involved in a particular Smart Contract.

When a Smart Contract's provisions are activated, that trigger is often described as requiring third party information that establishes the relevant facts that cause the trigger to be activated.

Because the System has gathered and stored the data on the supply chain movement of a container, the System can be interrogated by a user which is either a Smart Contract application or the operator of a smart contract application.

EXAMPLE

A shipment of wine is to be sold by the seller to a buyer in China. Under the sale terms, payment for the shipment of wine is to be made when the wine is landed in Shanghai.

The shipment is a DES shipment (Delivered Ex Ship). In this type of transaction, it is the seller's responsibility to get the goods to the port of destination or to engage the forwarder to move the cargo to the port of destination uncleared. 'Delivery' occurs when the goods arrive in the Shanghai port.

The shipment is one container filled with the Seller's wine. The wine is packed into cartons. Cartons are loaded on pallets. Pallets are loaded into the container and the container is sealed.

The Container is provided with a unique identifying number which may or may not be an encrypted identifier.

The Seller has engaged the services of a freight forwarding company to transport the Container to the Buyer. The freight forward arranges for a trucking company to collect the Container from the Seller's premises.

The trucking company collects the Container and transports it to the port. The port takes custody of the Container which is subsequently loaded onto a ship. The ship transports the Container to Shanghai.

The parties involved in the relevant smart contract are the Seller, the freight forwarding company, the trucking company, the port, the shipping company and the receiving port and the Buyer. The accountants, bankers, insurers and lawyers for all the various parties may also have an interest in the Smart Contract and the progress of the shipment.

The point of delivery may vary from contract to contract depending on the terms agreed between the respective Seller and Buyer. In some instances, the point where ownership and liability move could take place very early in the supply chain.

Regardless of the terms, the information stored in the system on a distributed ledger could be accessed by the Smart Contract to determine if the trigger point for a particular transaction has been reached.

Auditing

An auditor or any other interested third party may use the application to interrogate the database, 321, to determine the status of a given Item. This data would include any information recorded on the database in relation to the Item's origins, rights limits or the Item's chain of custody.

Sealing Certainty

In the case that customs or other regulatory authority needs to validly access the Container and the device or technology, the system allows them to take custody of the item, and this is recorded on the database. As a result, a degree of certainty regarding when a container was opened may be obtained.

Block Chain Structures

Blockchain structures may be used to advantage with any of the above described embodiments.

Figure 11:
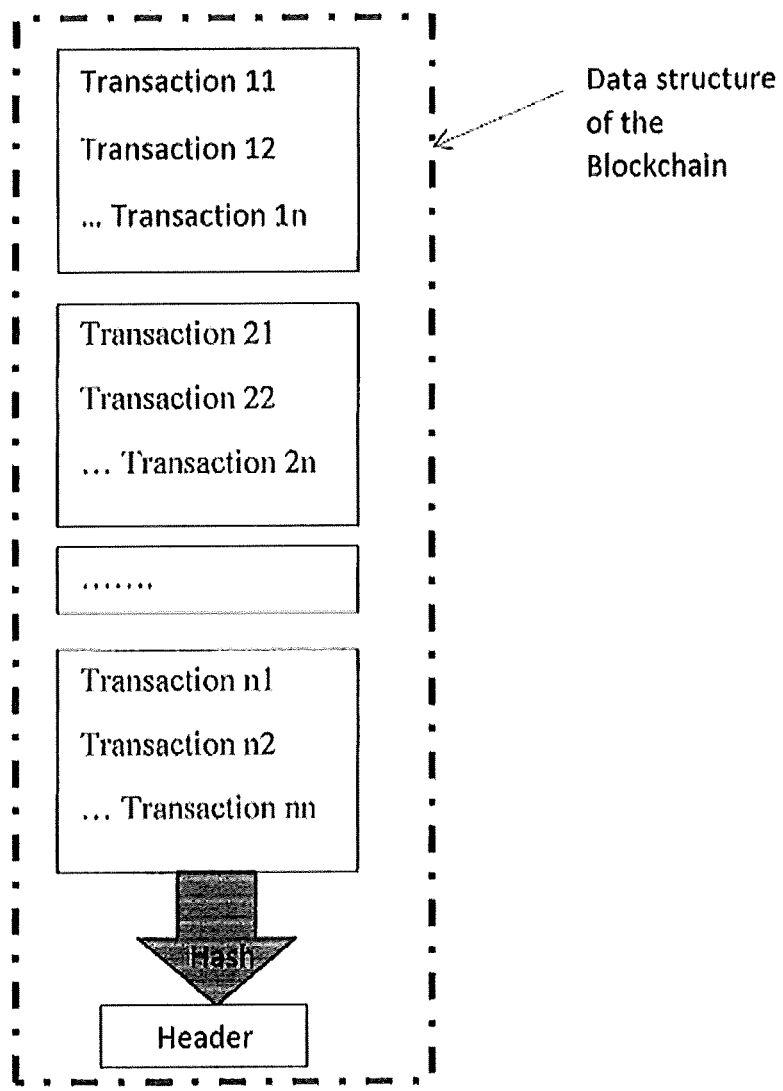
FIG. 11 is an diagram of an exemplary block chain data structure

FIG. 11 is a diagram of an exemplary block chain data structure

Figure 12:
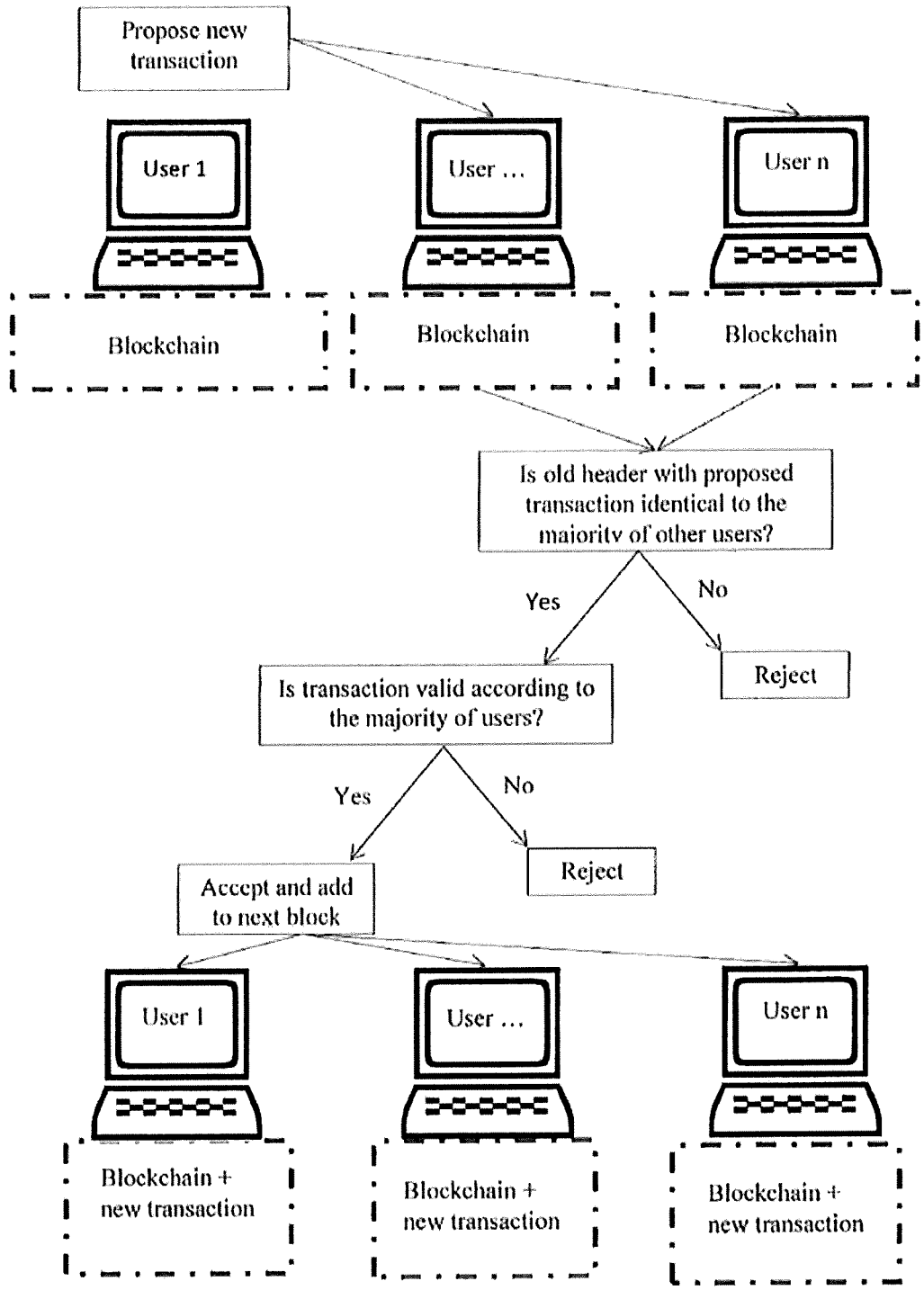
FIG. 12 illustrates diagrammatically use of the block chain data structure of FIG. 11.

FIG. 12 illustrates diagrammatically use of the block chain data structure of FIG. 11.

With reference to FIGS. 11 and 12, Blockchain is a data structure and distributed record system, which seeks to provide a data structure and system which maintains a complete record of all transactions and minimizes risk of retrospective alterations, or double or identical transactions.

The data structure consists of a series of transactions grouped in blocks, which need to be verified before they are added to the chain. Rules may be set so no data is ever deleted, with the longest chain being taken to be the most recent, and so the chain records all transactions from its initiation in chronological order.

A copy of the chain is kept by all users, and so is a distributed record system. Before any transactions are added the majority of the users need to agree that the transaction is acceptable and then it is bundled with other acceptable transactions into a block, which is added to the chain. Each block has a header which can only be created knowing all the previous transactions. As a result, if a retrospective alteration is made the header will be incorrect and any new block proposed by that user will be rejected. The security of the system is further enhanced by having mathematical problems that can only be solved by trial and error, which use the header and must be solved and then verified by the majority of other users before a block is accepted into the chain by all users. As long as there are more genuine users than coordinated attackers trying to alter the chain then the chain will be secure. There may be other methods used to determine the veracity of a block of data, this may include voting or consent processes where parties with a stake in the transaction or related transactions or in the chain itself are granted 'voting' rights. Another process may involve a random or systematized voting or approval system where the validity of the block of data is approved in accordance with a set of protocols agreed by those with a stake in the veracity of the chain of data.

In a more particular form, each block includes verified transactions and the blockchain maintains a ledger all prior transactions. The blockchain is duplicated by all the computers on a network.

The first block in the chain is known as the Genesis block and new blocks can be added in linear and chronological order. From any given block in the chain the information of this genesis block and all blocks that led back to this one can be retrieved. A blockchain is essentially numerous blocks connected through hash chaining where each block is comprised of the following Timestamp: provides proof that the data in a block existed at a particular time
Previous Hash: Essentially a pointer to the previous block
Merkle Hash: Summary of all executed transactions
Nonce: Individual blocks identity and is an arbitrary number which can only be used once The blockchain is managed by a network of distributed nodes where each node contains a copy of the entire blockchain. Each node in the network can add blocks to the chain, where every node is adding blocks at the same point in the chain at the same time. The more nodes that comprise the network the harder it is to disrupt the storage of the blockchain. Unlike centralised systems which rely on a single authority, there is no single point of failure in these distributed nodes network. If you change the content of a block you change its Hash.

INDUSTRIAL APPLICATION

Embodiments of the invention, as described by way of example above may be utilised with advantage in supply chain management with particular reference to be able to identify anomalies in the chain such as the introduction of non-authorised goods in the form of counterfeit goods.

The invention claimed is:

1. A system of verification of an aspect of an item, said system comprising:
a processor which ascribes a unique identifier to the item in respect of that aspect, the processor storing the unique identifier in a table in memory referenced against the item on a server, and causing transmission of the item from a first location to a second location by use of a communications system, wherein
the aspect comprises an originator of the item, and the sponsorship or approval of the item,
a handheld digital communications device accesses by reference to the item itself the unique identifier ascribed to the item, acquires the aspect of the item, and includes a GPS apparatus in communication with the memory and said processor whereby information as to the location of the handheld digital communications device in three-dimensional space is acquired for use and on transmission by the handheld digital communications device, and
the handheld digital communications device and said processor cause a comparison of the unique identifier thus obtained with the unique identifier stored on the server referenced against the item whereby the aspect of the item is verified if the unique identifier thus obtained matches with the unique identifier stored on the server referenced against the item.

2. The system of claim 1 wherein the aspect comprises the origin of the item.

3. The system of claim 1 wherein the table is maintained in a blockchain structure maintained by and accessible across a multiplicity of servers.

4. Media containing code which, when executed by a processor, implements the system of claim 1.

5. The system of claim 1 wherein the custody of a group of items is transferred from one party to another using a private key of a transferor to inform the table that transfer of the custody of a unique identifier associated with the group of items is to be transferred to a public key of a transferee.

6. The system of claim 1 wherein a sub-unique identifier is associated with the unique identifier, the sub-unique identifier includes data related to the unique identifier and passage of the unique identifier between at least the first and second locations.

7. The system of claim 1 wherein the unique identifier is read and communicated to the table each time an event occurs in a custodial chain for the item.

8. The system of claim 1 wherein a check is conducted that the unique identifier is identified only once at least at the first and second locations.

9. The system of claim 1 wherein an alarm condition is raised if the unique identifier is identified more than once or if the unique identifier does not exist in the table.

10. The system of claim 6 wherein the sub-unique identifier includes the address of a holder.

11. The system of claim 6 wherein the sub-unique identifier includes rules created by the originator.

* * * * *